United States Patent [19]
Yoshida et al.

[11] Patent Number: 5,647,612
[45] Date of Patent: Jul. 15, 1997

[54] COUPLING FOR PIPES

[75] Inventors: Satohisa Yoshida, Anjo; Akihito Namikawa; Kenji Ogura, both of Kariya; Masayoshi Enomoto, Obu, all of Japan

[73] Assignee: Nippondenso Co., Ltd., Kariya, Japan

[21] Appl. No.: 415,921

[22] Filed: Apr. 3, 1995

[30] Foreign Application Priority Data

| Apr. 4, 1994 | [JP] | Japan | 6-065947 |
| Dec. 27, 1994 | [JP] | Japan | 6-325197 |
| Feb. 8, 1995 | [JP] | Japan | 7-020196 |
| Feb. 9, 1995 | [JP] | Japan | 7-021641 |
| Feb. 10, 1995 | [JP] | Japan | 7-022661 |

[51] Int. Cl.⁶ .................................. F16L 55/00
[52] U.S. Cl. ............... 285/13; 285/14; 285/351; 285/365; 285/373; 285/420; 285/423; 285/906
[58] Field of Search .......................... 285/373, 419, 285/112, 13, 14, 365, 366, 367, 407, 408, 409, 410, 423, 411, 420, 353, 906, 351

[56] References Cited

U.S. PATENT DOCUMENTS

| 1,649,752 | 11/1927 | Stone | 285/373 X |
| 2,271,425 | 1/1942 | Harris | 285/367 |
| 3,788,677 | 1/1974 | Stade et al. | 285/410 X |
| 3,865,413 | 2/1975 | Mizusawa et al. | 285/367 |
| 4,055,359 | 10/1977 | McWethy . | |
| 4,284,298 | 8/1981 | Kaufmann, Jr. . | |
| 4,311,248 | 1/1982 | Westerland et al. | 285/365 X |
| 4,452,097 | 6/1984 | Sunkel | 285/419 X |
| 4,708,377 | 11/1987 | Hunting . | |
| 4,765,661 | 8/1988 | Fukushima et al. | 285/353 |
| 4,795,197 | 1/1989 | Kominski | 285/419 X |
| 4,915,418 | 4/1990 | Palatchy | 285/112 X |
| 4,915,424 | 4/1990 | Sarno | 285/373 X |
| 5,018,768 | 5/1991 | Palatchy . | |
| 5,188,400 | 2/1993 | Riley et al. | 285/419 X |
| 5,269,572 | 12/1993 | Mefferd . | |
| 5,320,391 | 6/1994 | Luthi | 285/365 |

FOREIGN PATENT DOCUMENTS

| 917993 | 2/1963 | United Kingdom . |
| 994844 | 6/1965 | United Kingdom . |
| 1172035 | 11/1969 | United Kingdom . |

*Primary Examiner*—Dave W. Arola
*Attorney, Agent, or Firm*—Cushman, Darby & cushman IP Group of Pillsbury Madison & Sutro LLP

[57] ABSTRACT

An apparatus for fixing a male and female couplings which are fitted with each other. A fixing device includes a first and second fixing member of a substantially semicircular cylindrical shape. A hinge device is provided for rotating the first and second fixing members between an opened condition and a closed condition. At the closed condition, the first and second fixing members cooperate to form a recess of a shape corresponding to that of the fitted part of the couplings thereby axially holding the couplings. A releasable lock is constructed by a catch member on the first fixing members and a latch member on the second fixing member. The releasable lock allows the fixing members to be easily engaged and disengaged, thereby increasing productivity during the pipe fitting operation.

24 Claims, 33 Drawing Sheets

Fig.5-A
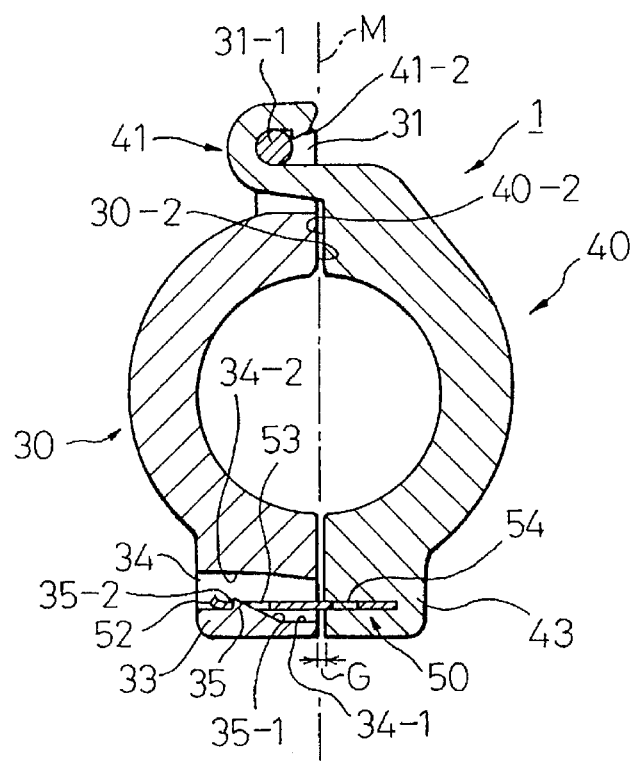
Fig.5-B
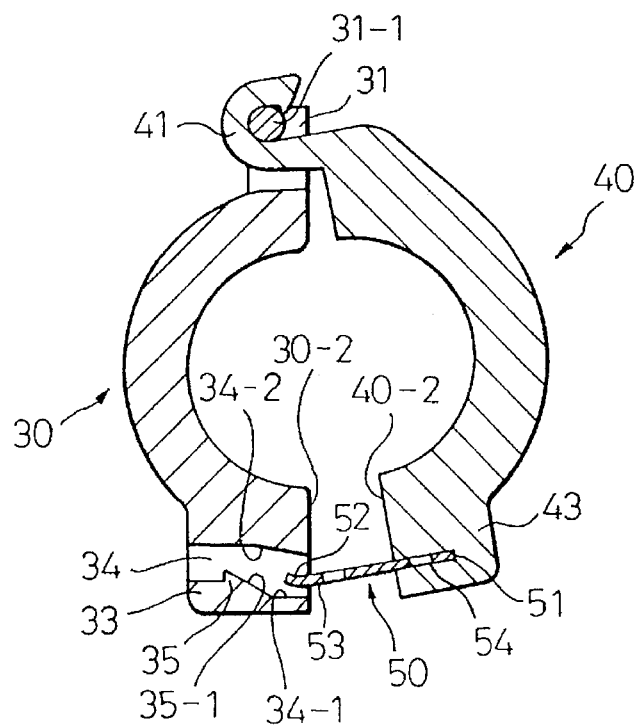

Fig.6-A
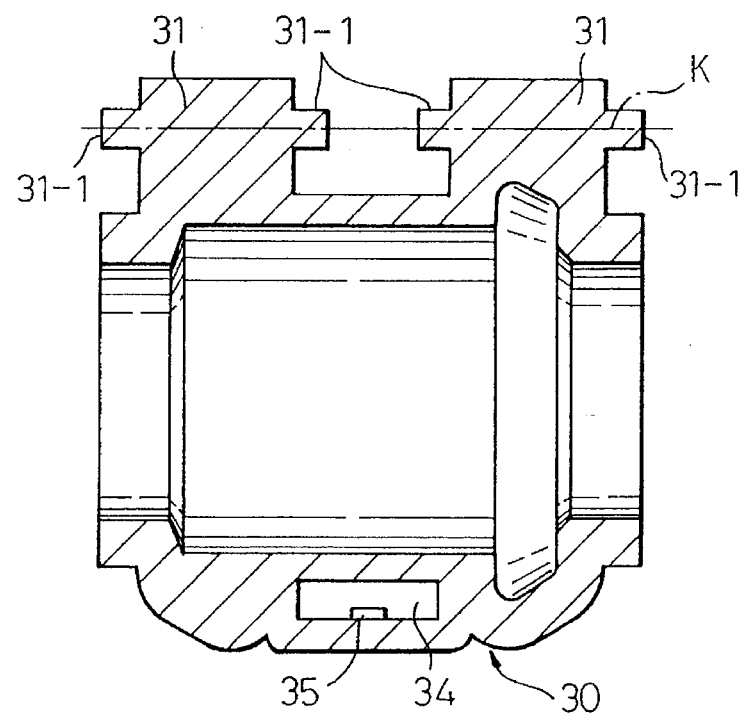
Fig.6-B
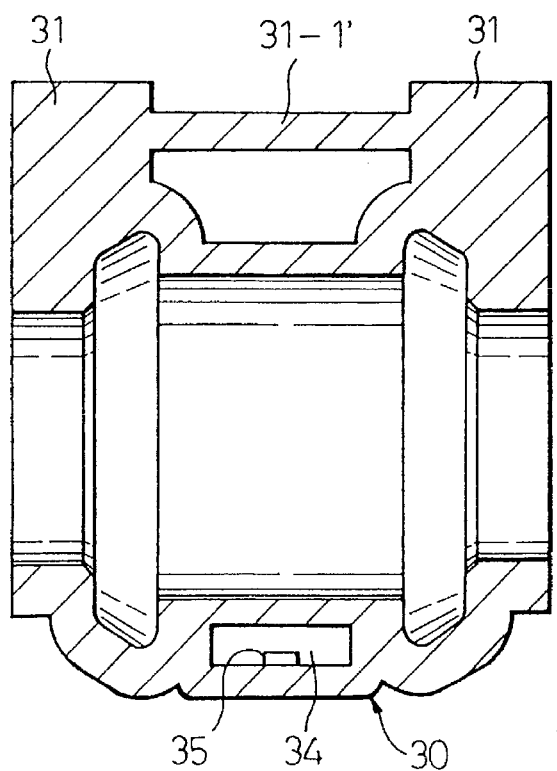

Fig.11-A
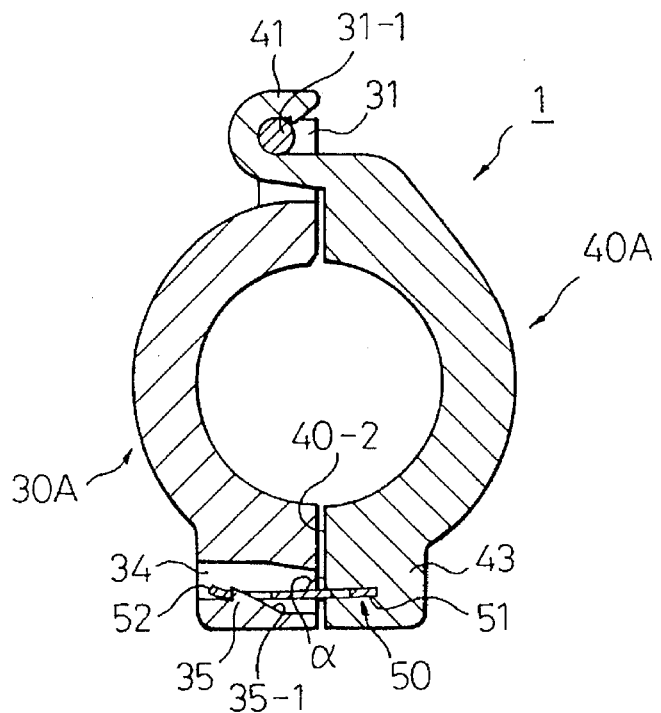
Fig.11-B
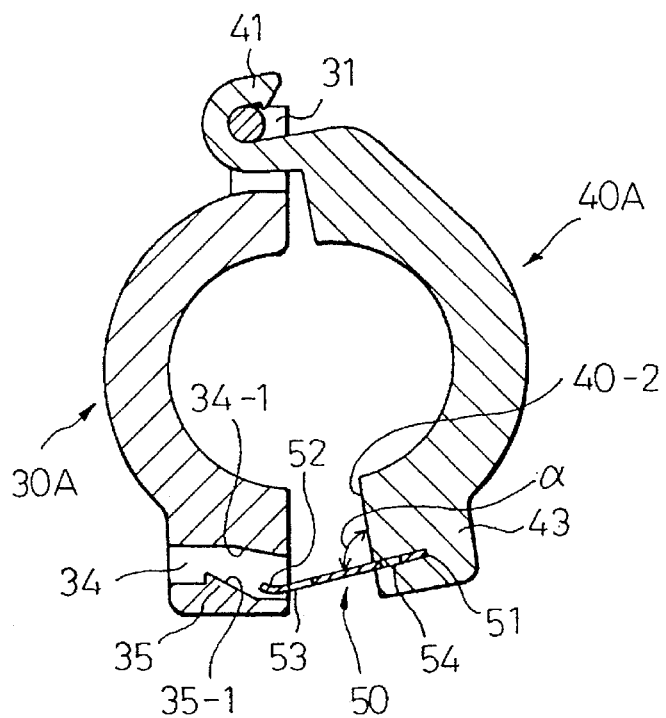

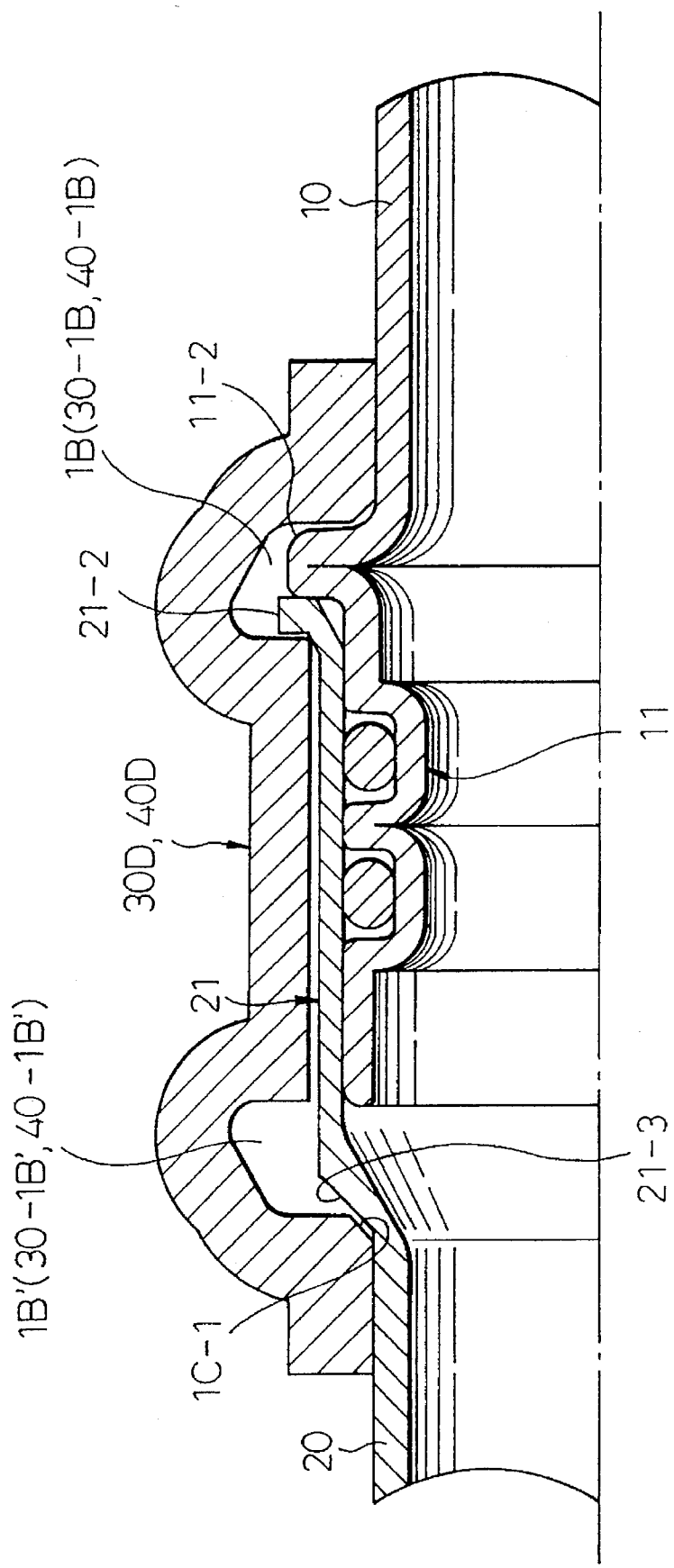

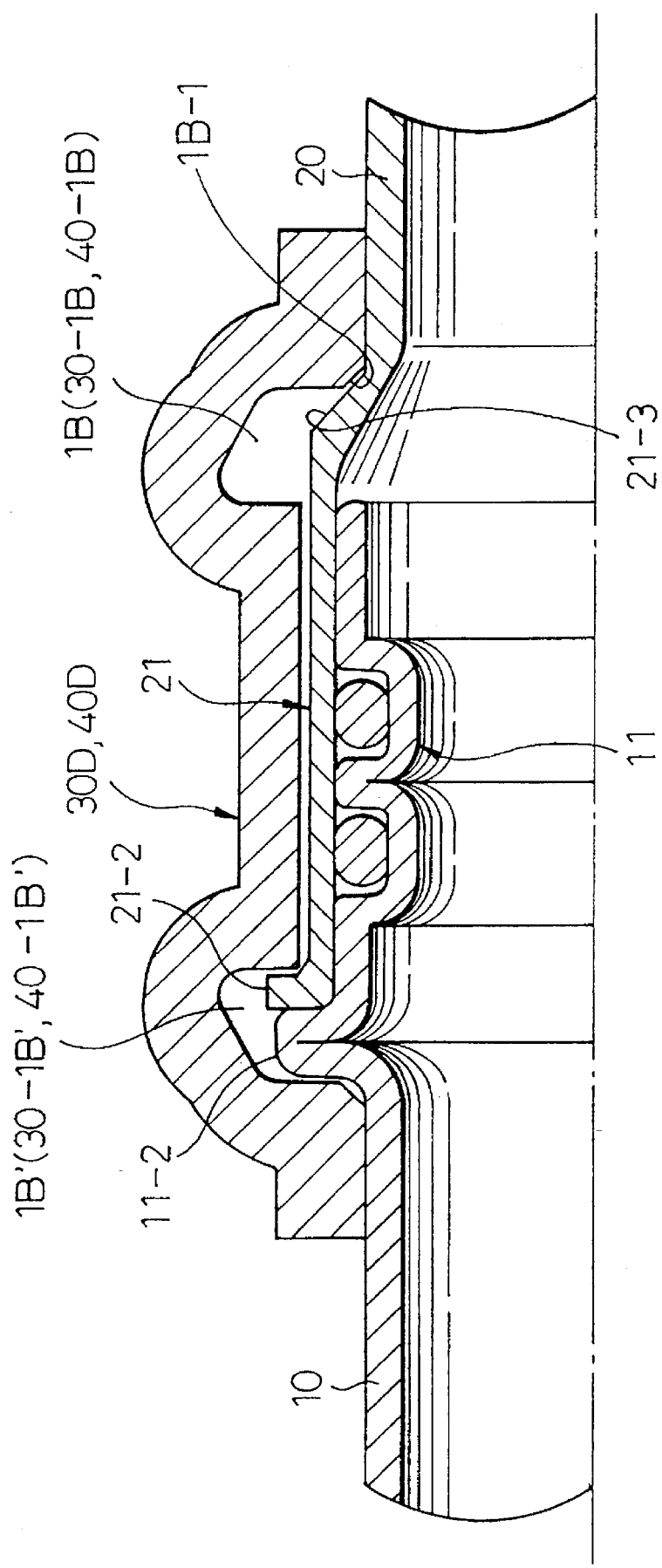

Fig.27-A
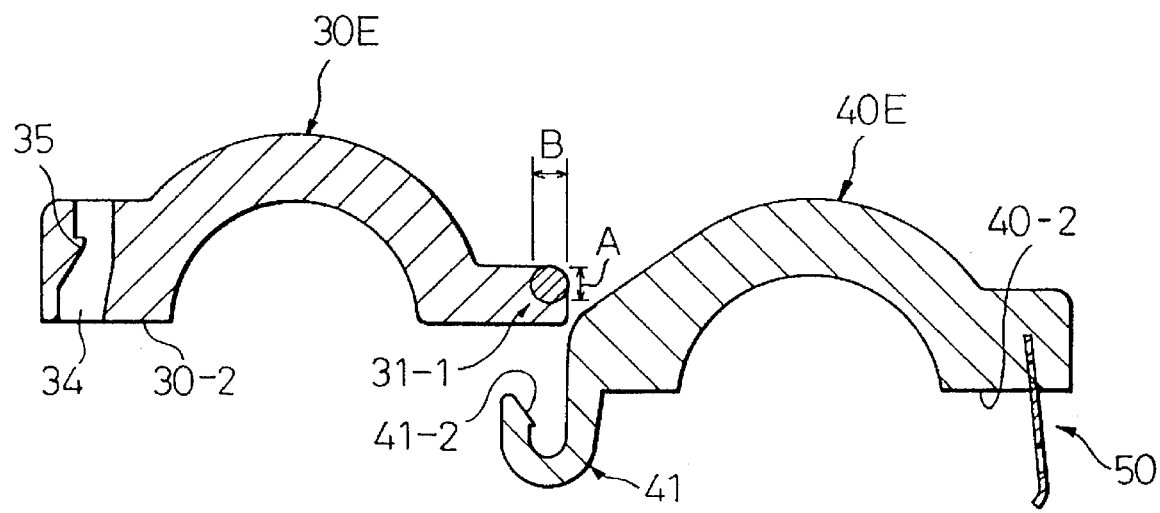
Fig.27-B
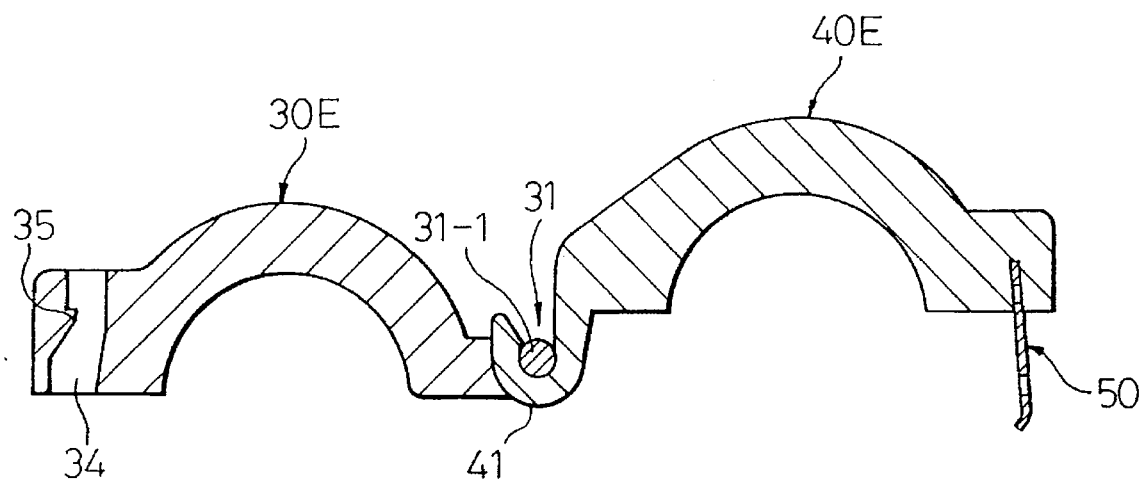

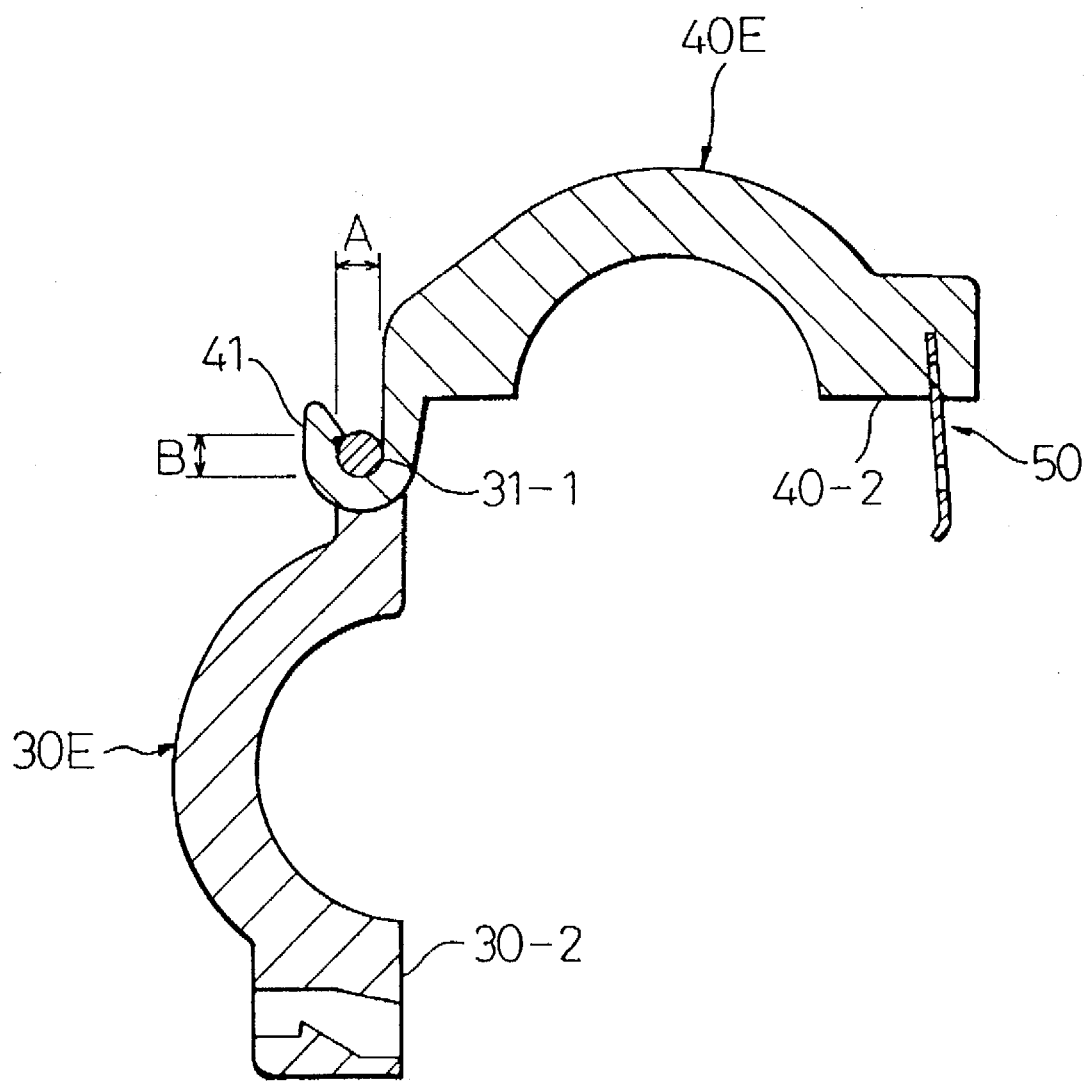
Fig.27-C

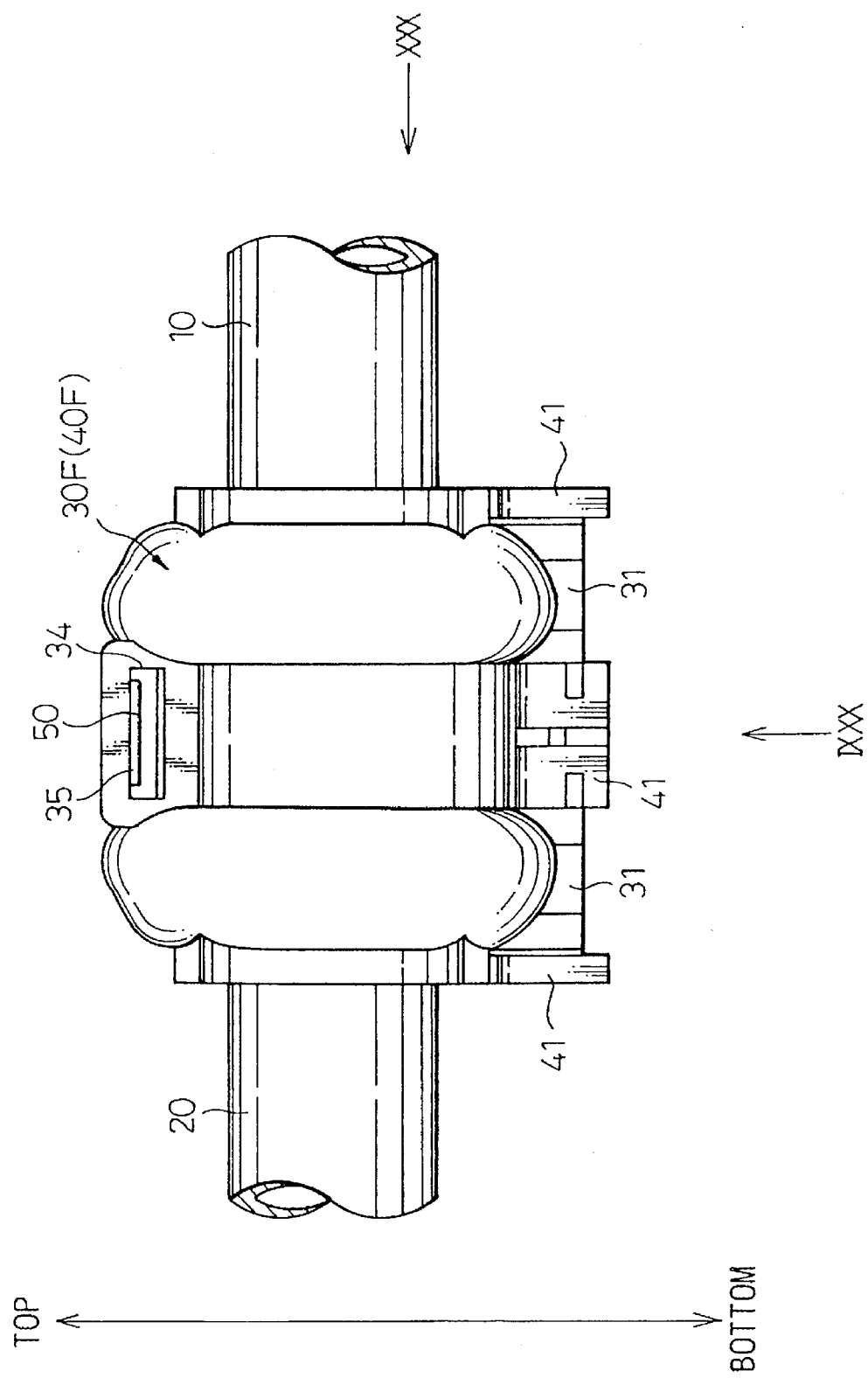

5,647,612

COUPLING FOR PIPES

BACKGROUND OF THE INVENTION

1. Field of the Invention

The present invention relates to a coupling for tubes for carrying a fluid.

The present invention can be, for example, used as a coupling for tubes for a refrigerant in a refrigerating circuit.

2. Description of Related Art

A connection, for tubes for passage of a fluid, by means of a nut union is known as a prior art. The cost for producing this type of the coupling is low. However, the adjustment of tightening the nut, which is time consuming, is essential during assembly. From the total view point, the cost of this type is high. Furthermore, during the use of the nut union, a tool, such as a torque wrench, is necessary in order to tighten the nut. As a result, a space is necessary around the coupling to allow the tool to be used.

In view of the above, an improvement in the coupling, which can eliminate the tool for tightening and can reduce the working time, was proposed in, for example, Japanese Examined Patent Publication No. 60-59478, wherein a circular spring for holding the outside of the female coupling was proposed.

However, in the construction in Japanese Examined Patent Publication No. 60-59478, a special tool is required to separate the male and female couplings. In other words, an operator who comes to a site without having the special tool cannot dismantle the coupling.

SUMMARY OF THE INVENTION

An object of the present invention is to provide a coupling capable of attaining a desired positive connection between the couplings, while disassembly of the coupling can be done without using any special tool.

According to the present invention, an apparatus for connecting pipes, for carrying a fluid, is provided, comprising:

a male coupling member at an end of one of the pipes;

a female coupling member at an end of the other pipe, the male coupling being capable of fitted to the female coupling member;

a first and second fixing member having inner shapes adapted for receiving therein the fitted coupling members for axially fixing their fitted condition;

hinge means on the first and second fixing members for obtaining a hinged connection between the first and second fixing members, and;

releasable locking means on the first and second fixing members opposite the hinge means for locking the first and second fixing members.

BRIEF DESCRIPTION OF ATTACHED DRAWINGS

FIG. 5-A is a transverse cross-sectional view of the fixing device according to the present invention when it is under a closed condition.

FIG. 5-B is similar to FIG. 5-A, but shows when it is under an opened condition.

FIG. 6-A is a longitudinal cross-sectional view of a first fixing member in the fixing device in FIG. 5-A.

FIG. 6-B is similar to FIG. 6-A but shows a modification.

Figure 7:
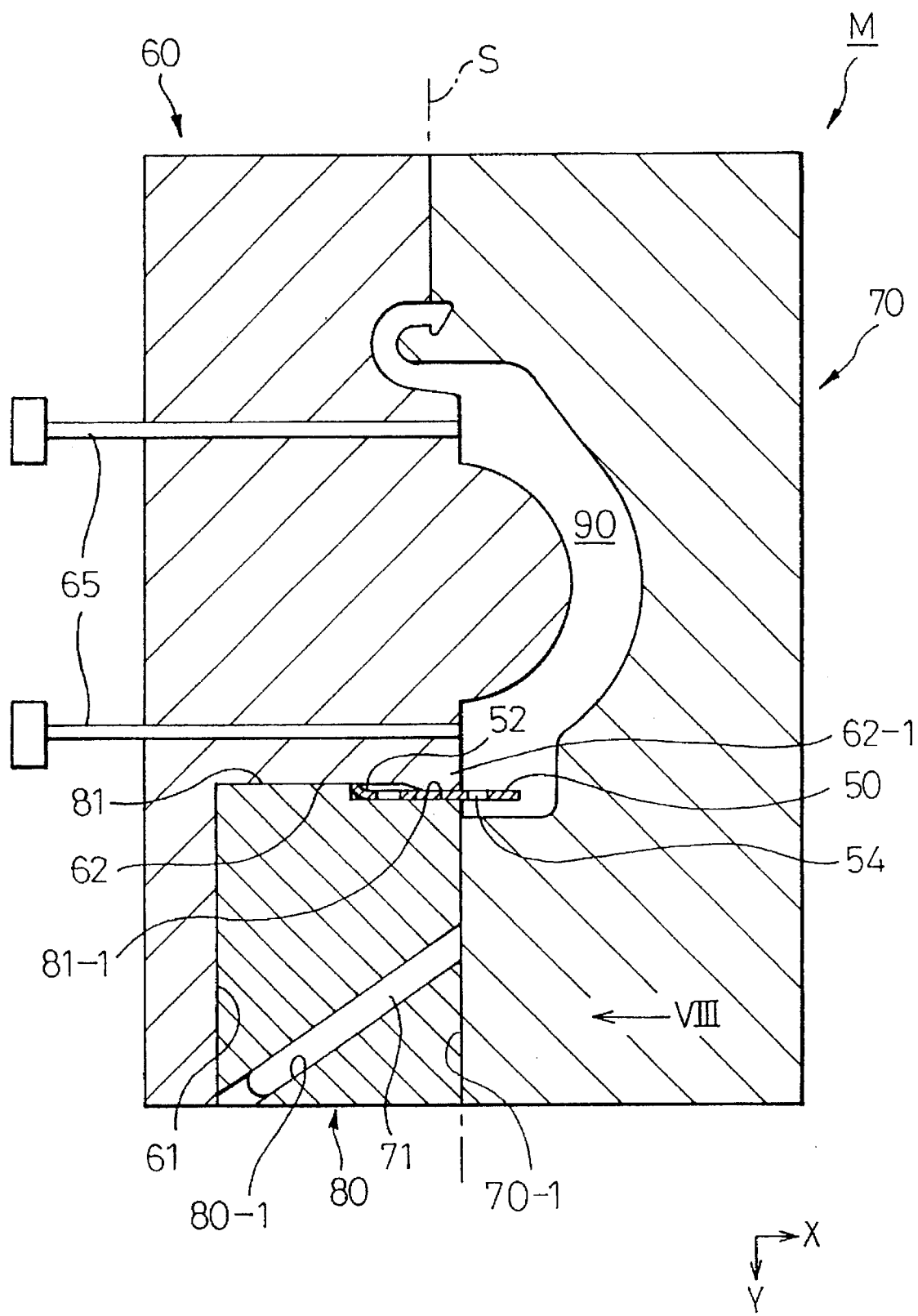

FIG. 7 is a cross-sectional view of a mold for forming a second fixing member in the fixing device in FIG. 5-A.

Figure 8:
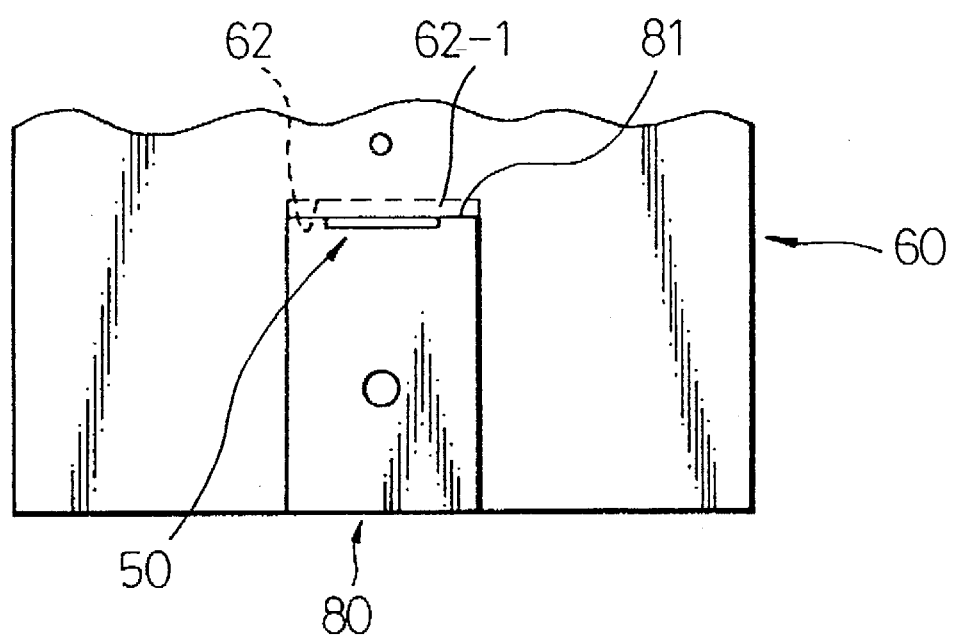

FIG. 8 is a view taken along a line VIII in FIG. 7

Figure 9:
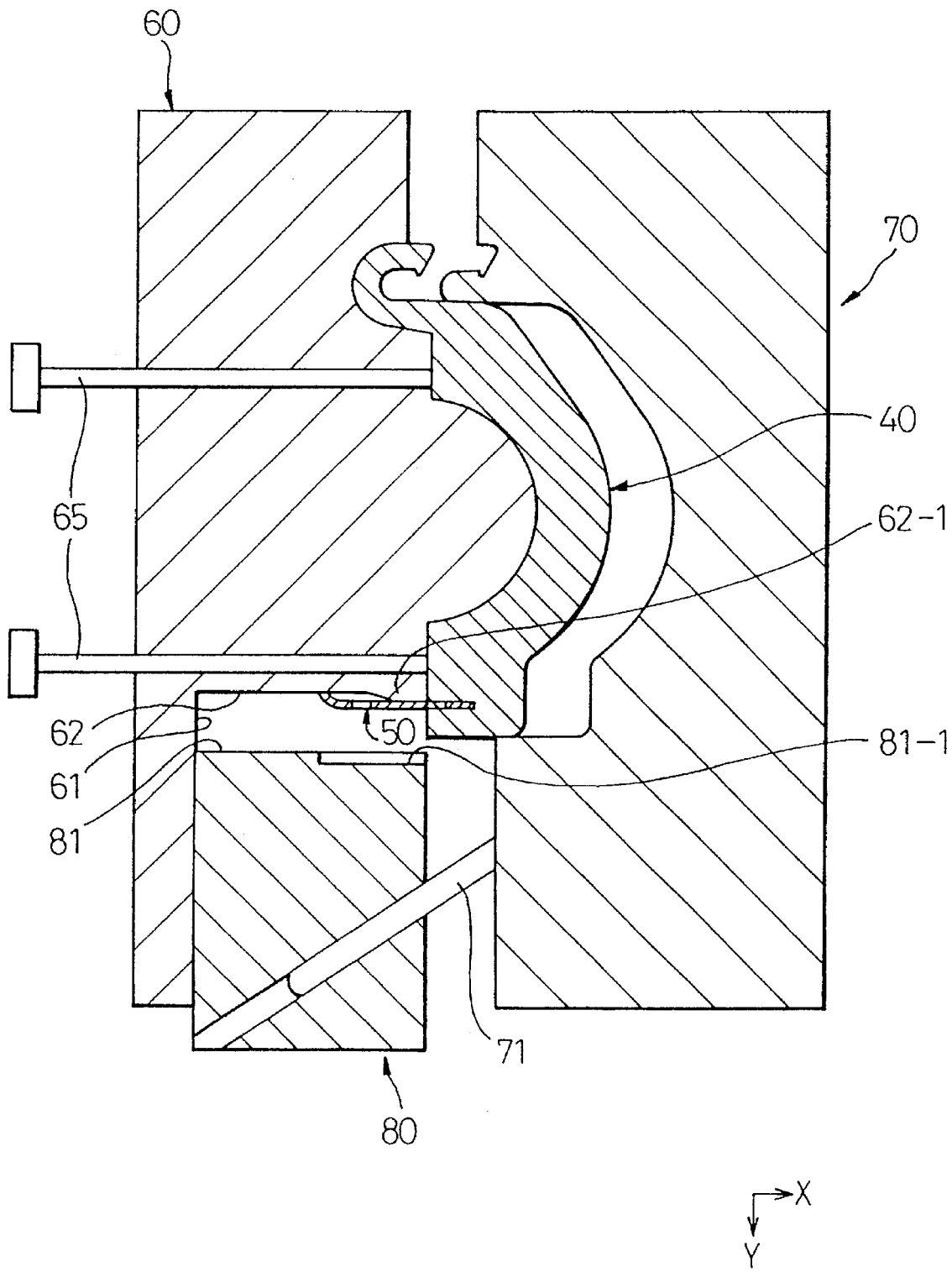

FIG. 9 is similar to FIG. 7 but shows a condition when a cavity mold is partly withdrawn from a core mold.

Figure 10:
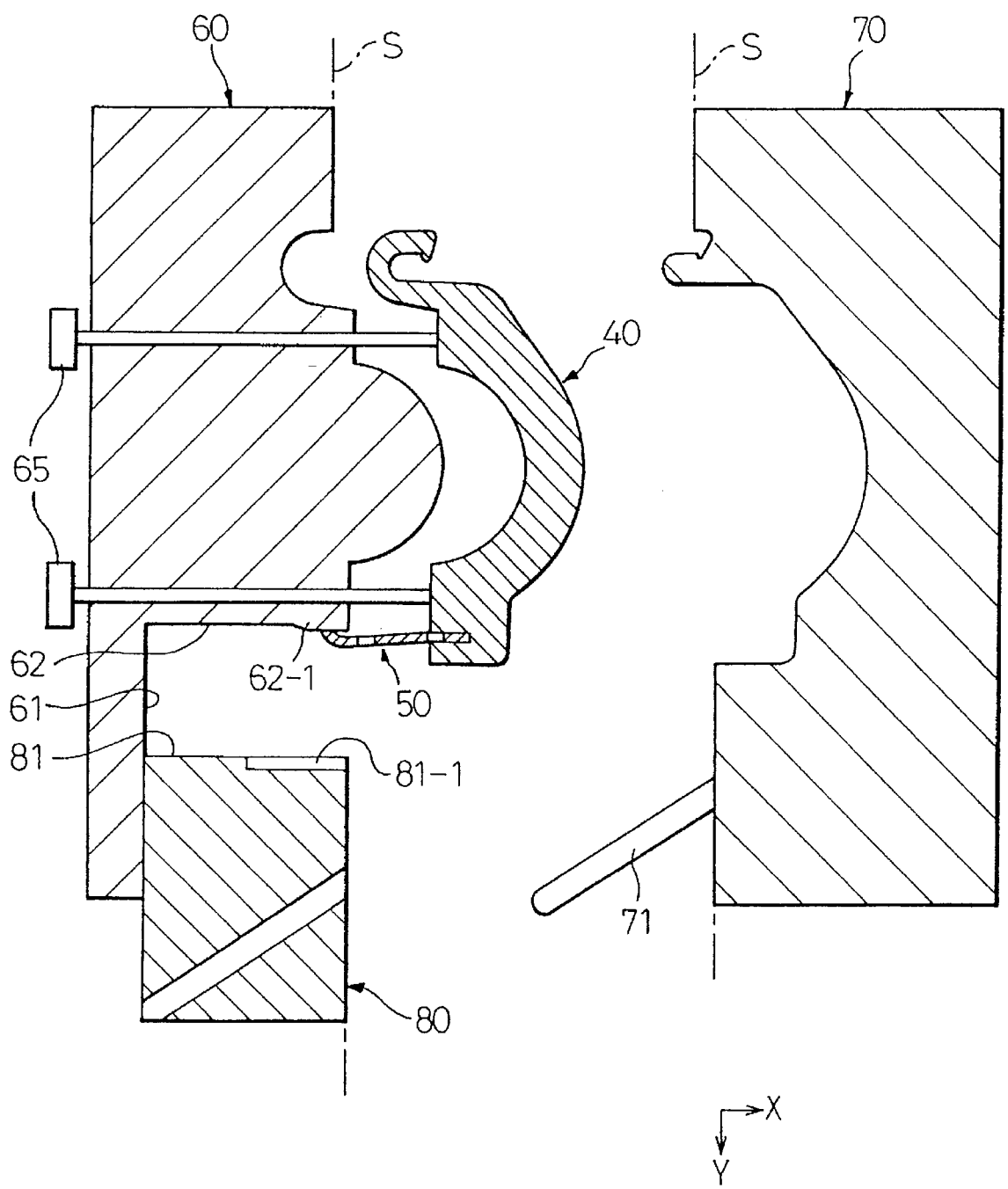

FIG. 10 is similar to FIG. 7 but shows a condition when a cavity mold is completely withdrawn from a core mold.

FIG. 11-A is similar to FIG. 5-A but illustrates a different embodiment of a slightly inclined construction of a latch member.

FIG. 11-B is similar to FIG. 11-A but illustrates a condition where the fixing device is opened.

Figure 12:
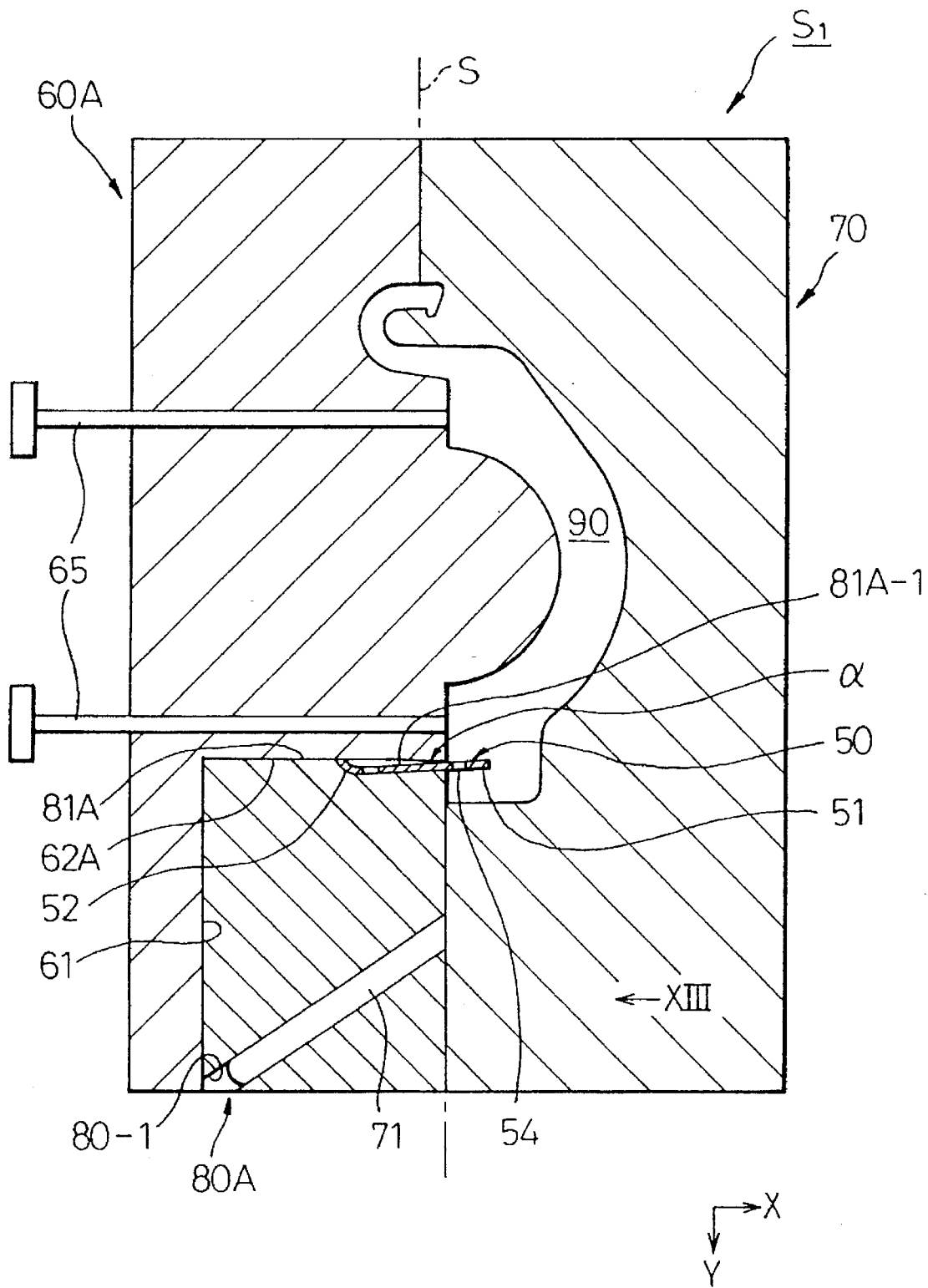

FIG. 12 is a cross-sectional view of a mold for forming a second fixing member in the fixing device in FIG. 11-A.

Figure 13:
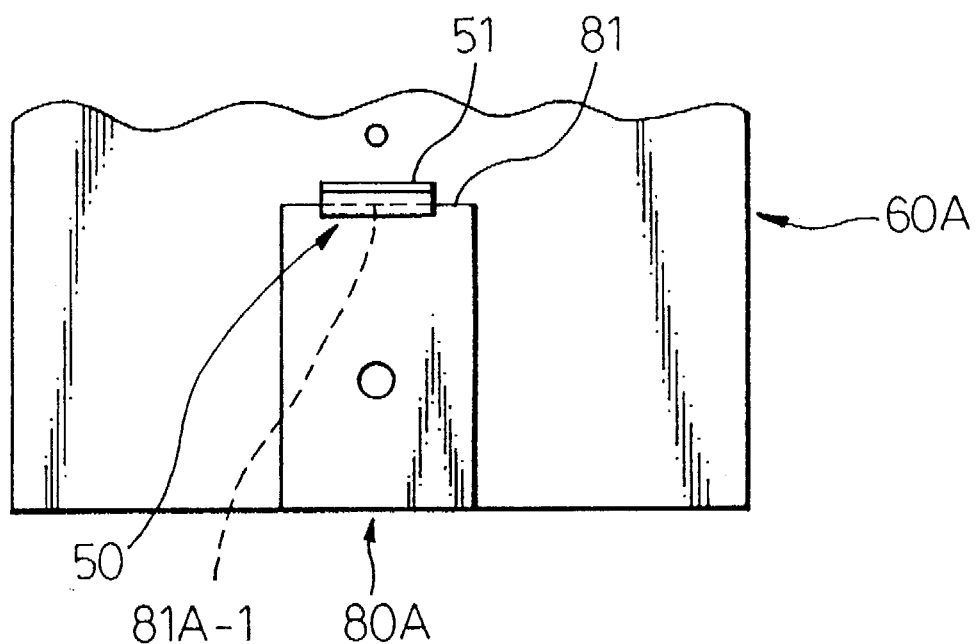

FIG. 13 is a view taken along a line XIII in FIG. 12.

Figure 14:
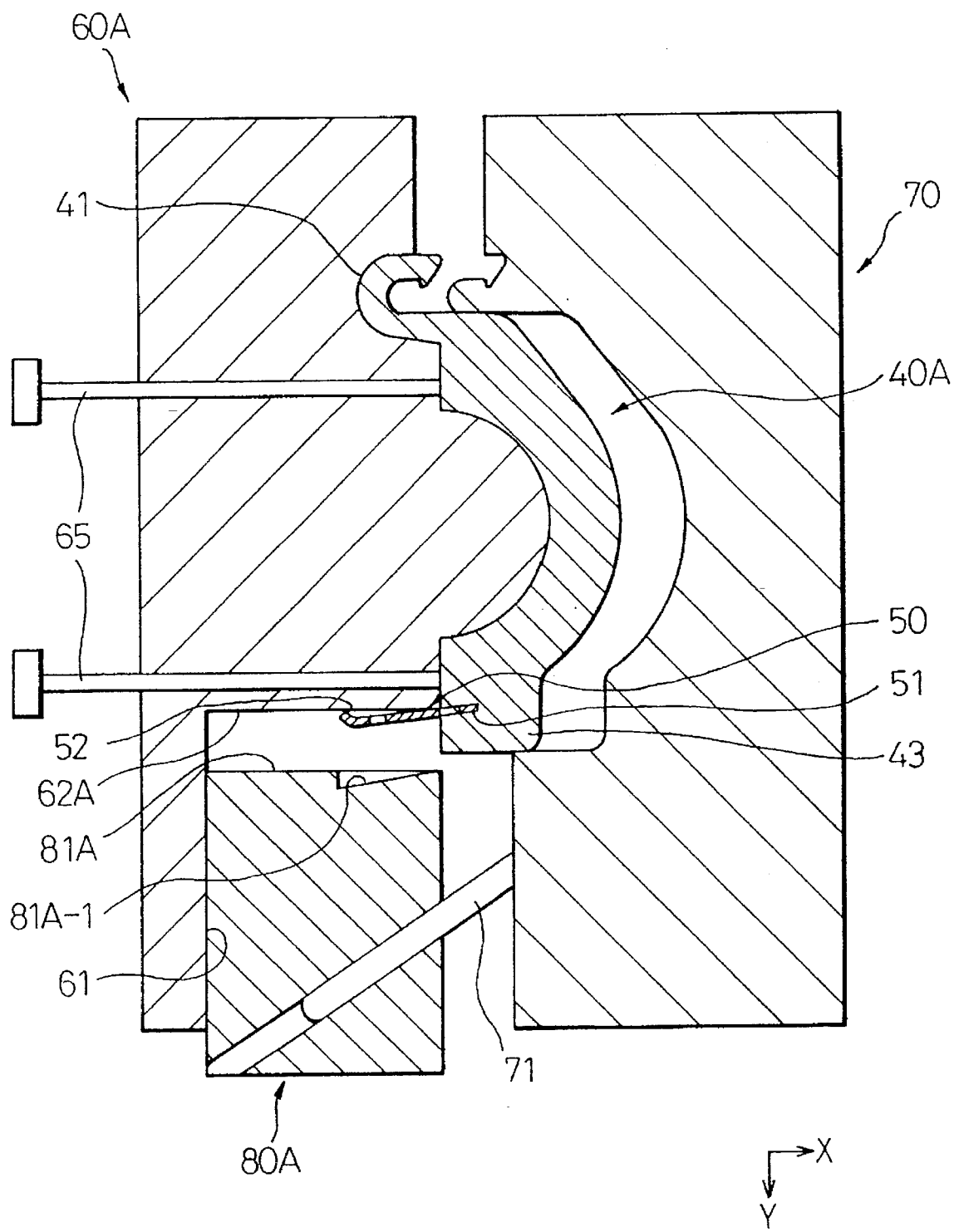

FIG. 14 is similar to FIG. 12 but shows a condition when a cavity mold is partly withdrawn from a core mold.

Figure 15:
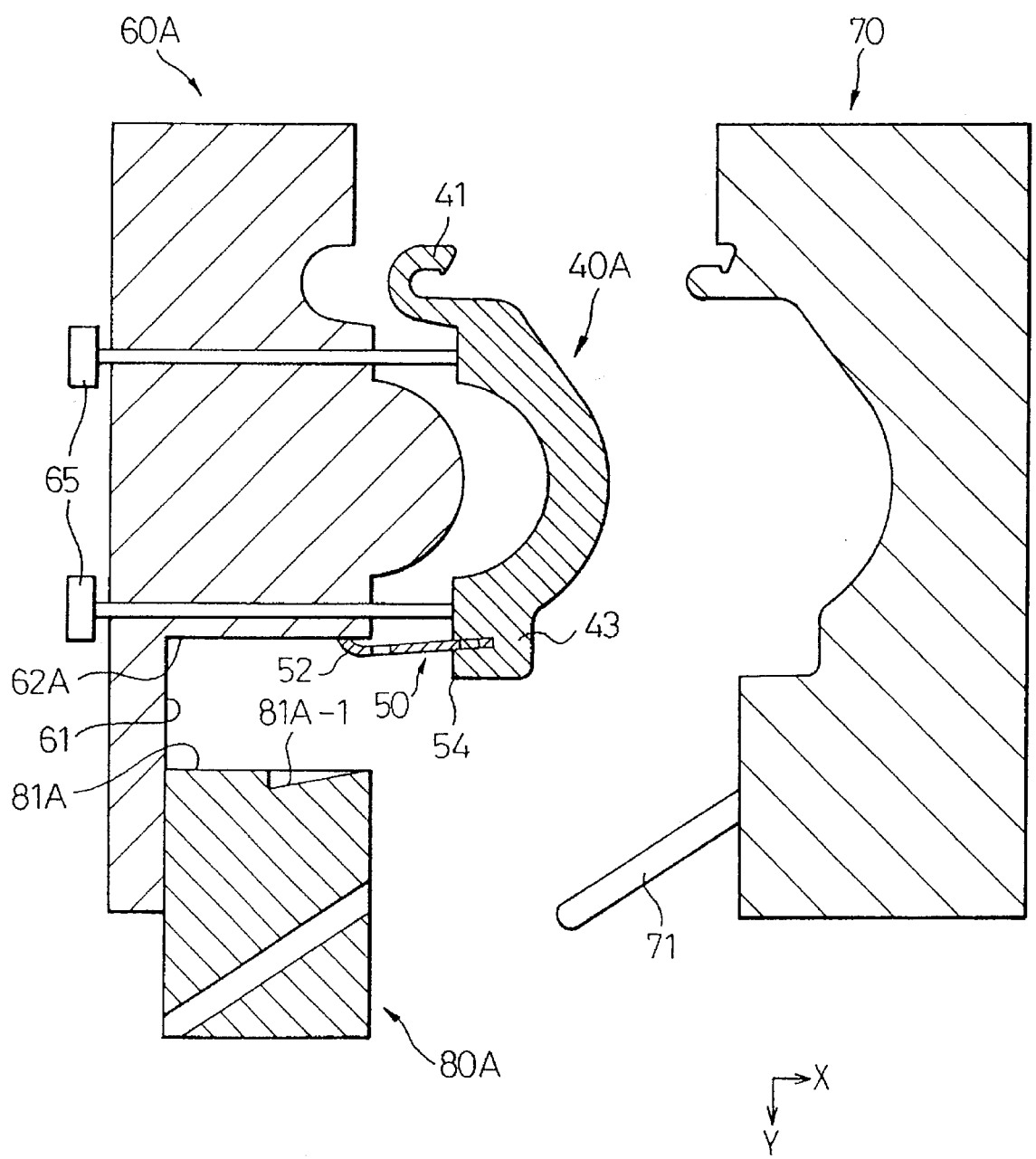

FIG. 15 is similar to FIG. 12 but shows a condition when a cavity mold is completely withdrawn from a core mold.

Figure 16:
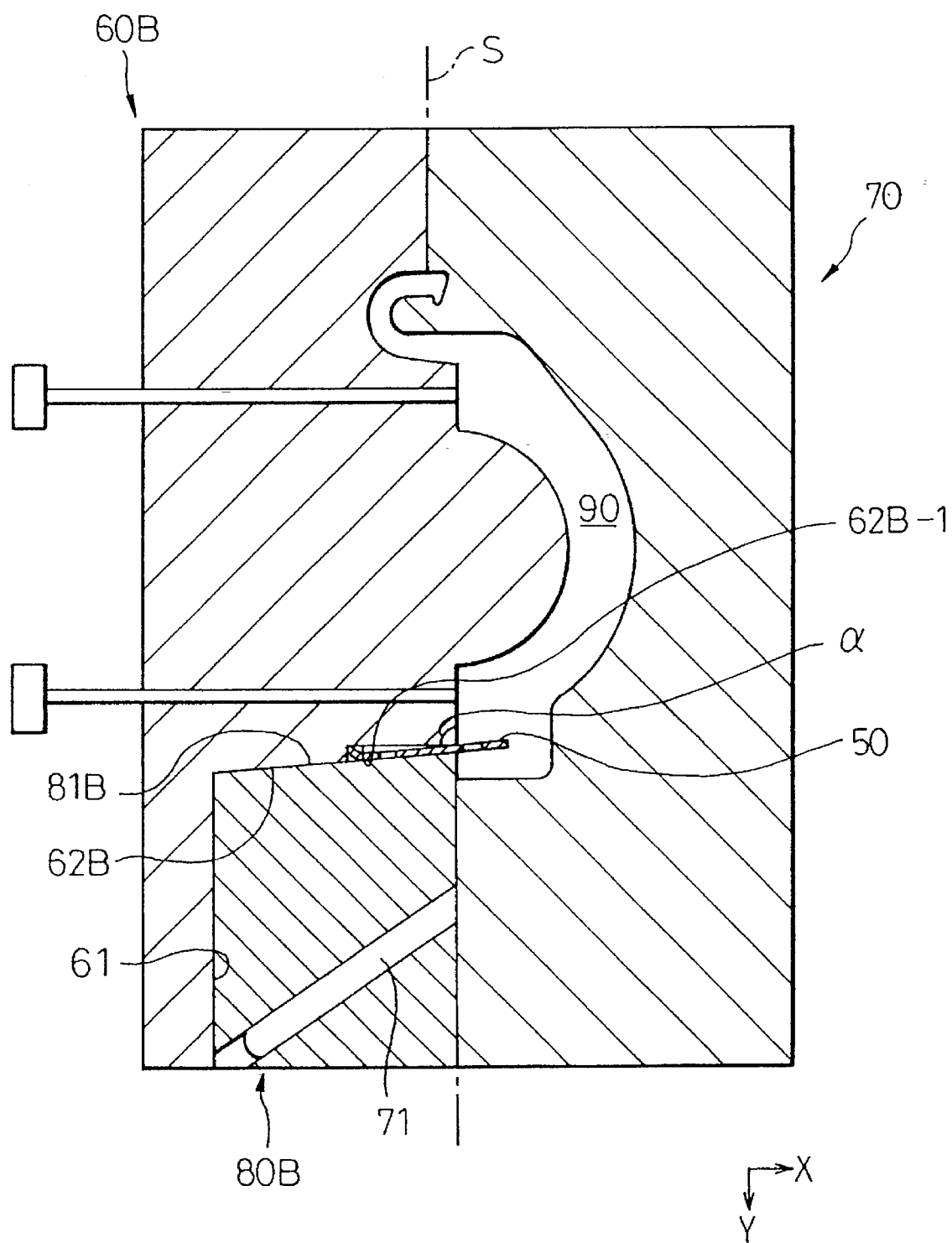

FIG. 16 is similar to FIG. 12 but shows a mold for forming a second fixing member in the fixing device in FIG. 11-A.

Figure 17:
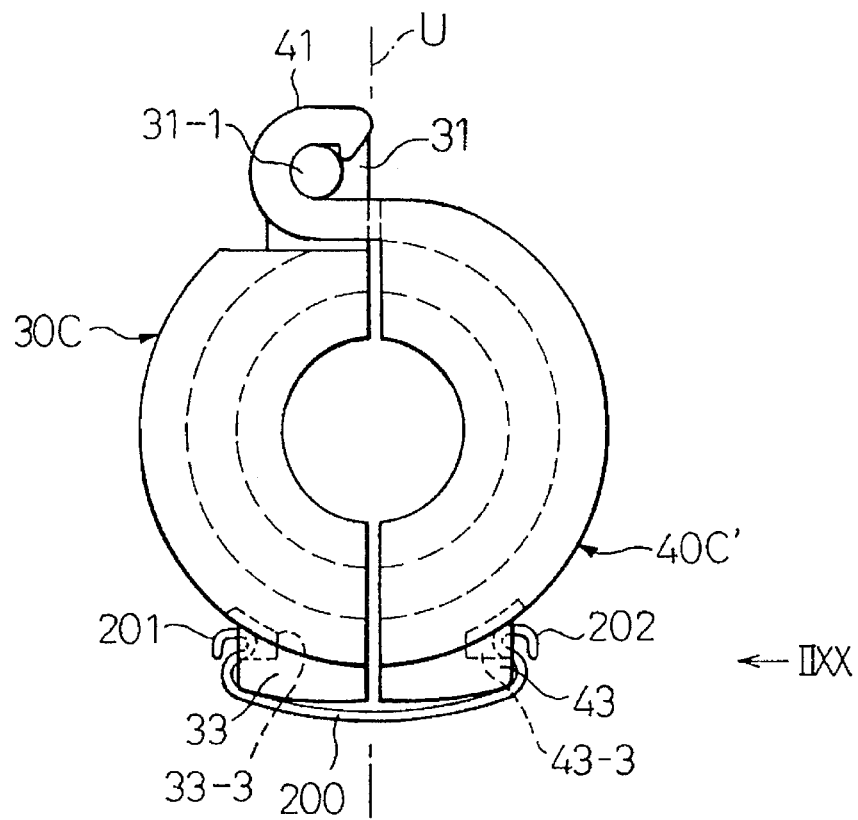

FIG. 17 is side view of a fixing device in a different embodiment.

Figure 18:
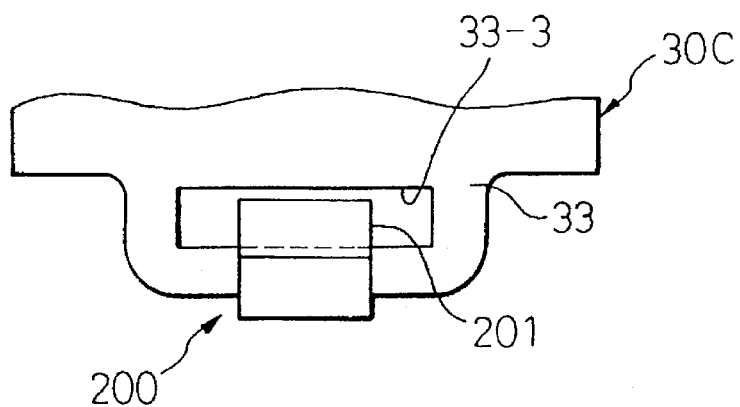

FIG. 18 is a view taken along a line IIXX in FIG. 17.

Figure 2:
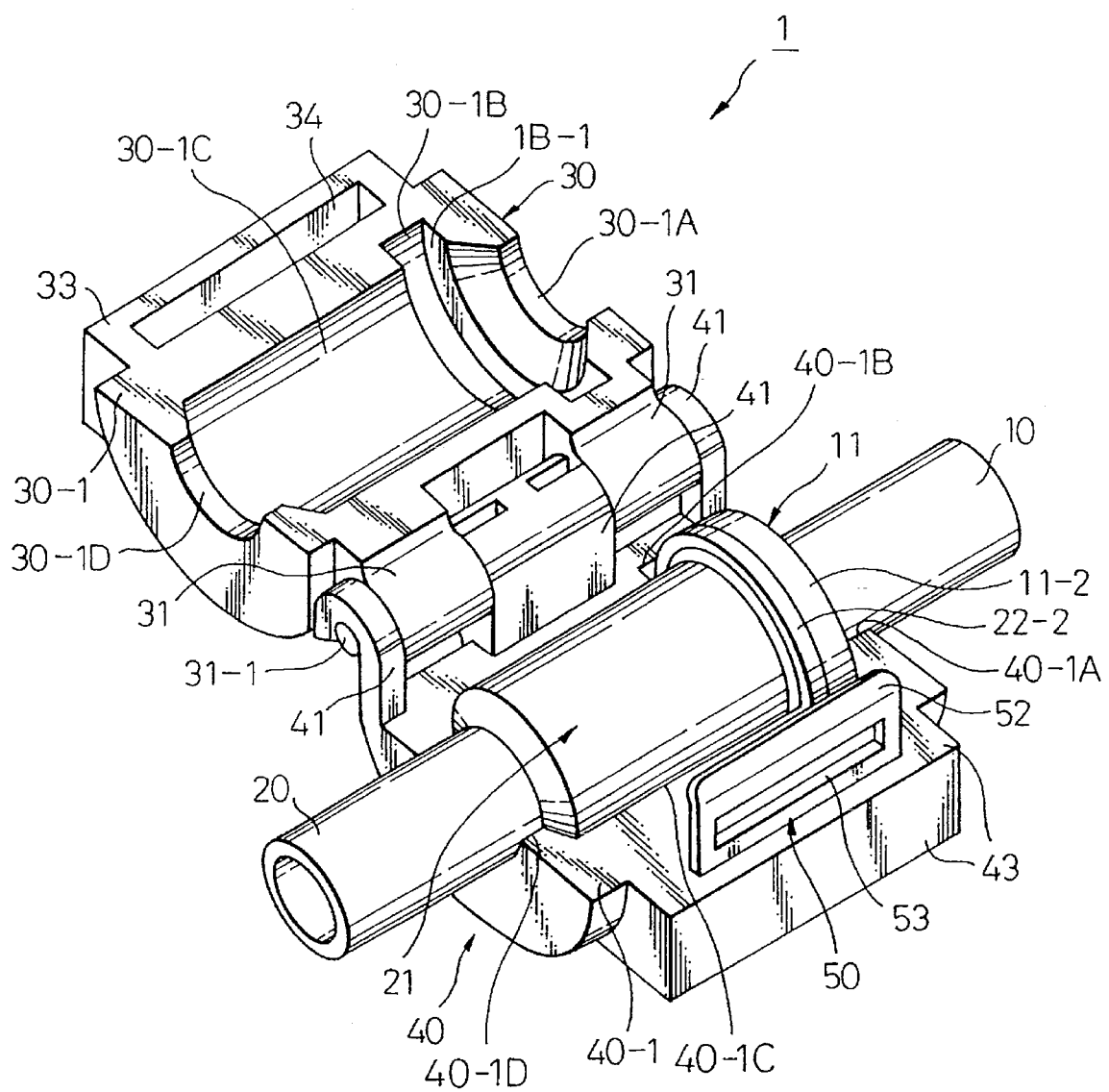
FIG. 2 is a perspective view of a fixing device according to the present invention, when it is under an opened condition.
Figure 19:
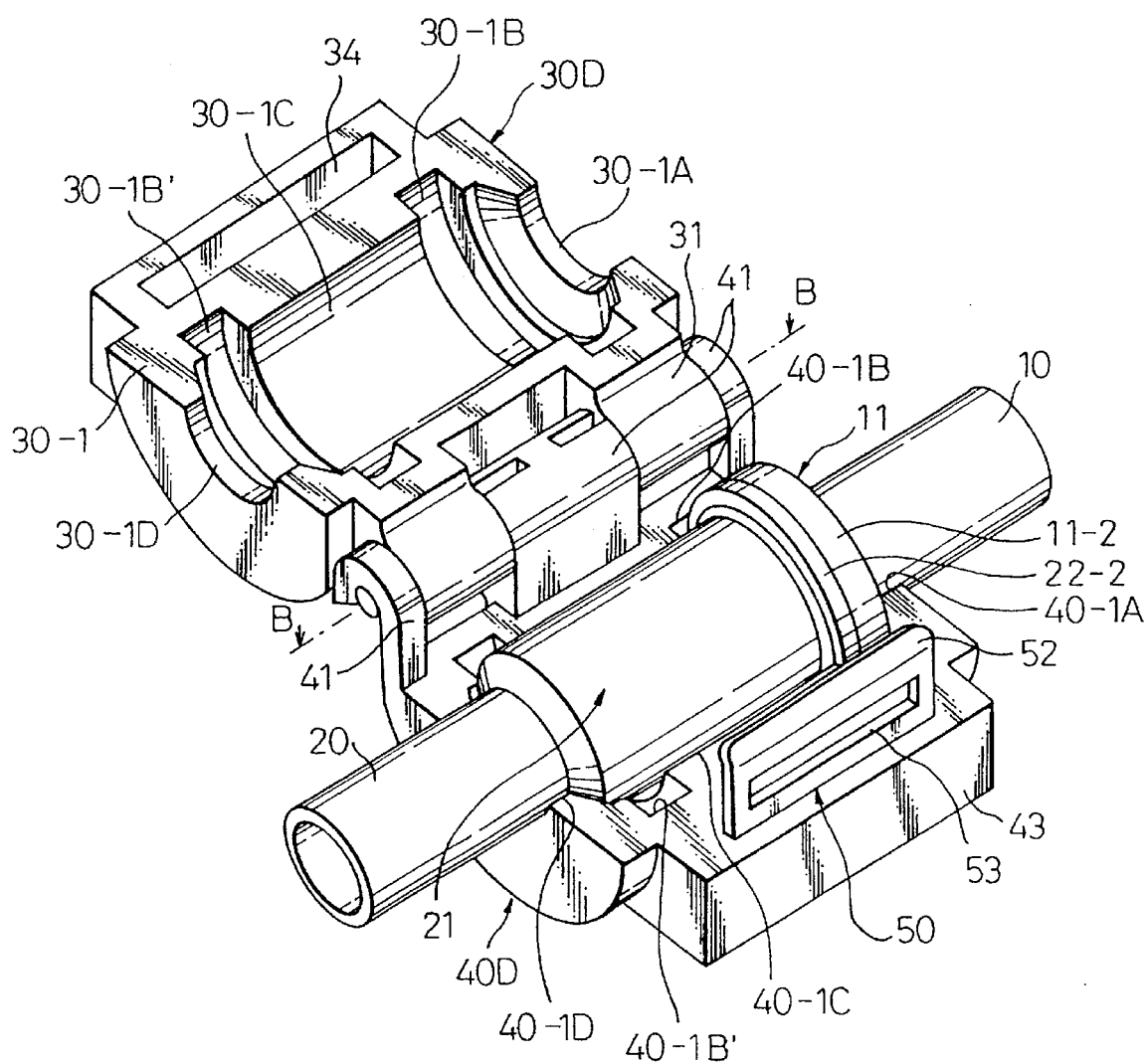

FIG. 19 is similar to FIG. 2 but illustrates a different embodiment of symmetrical inner shape.

Figure 1:
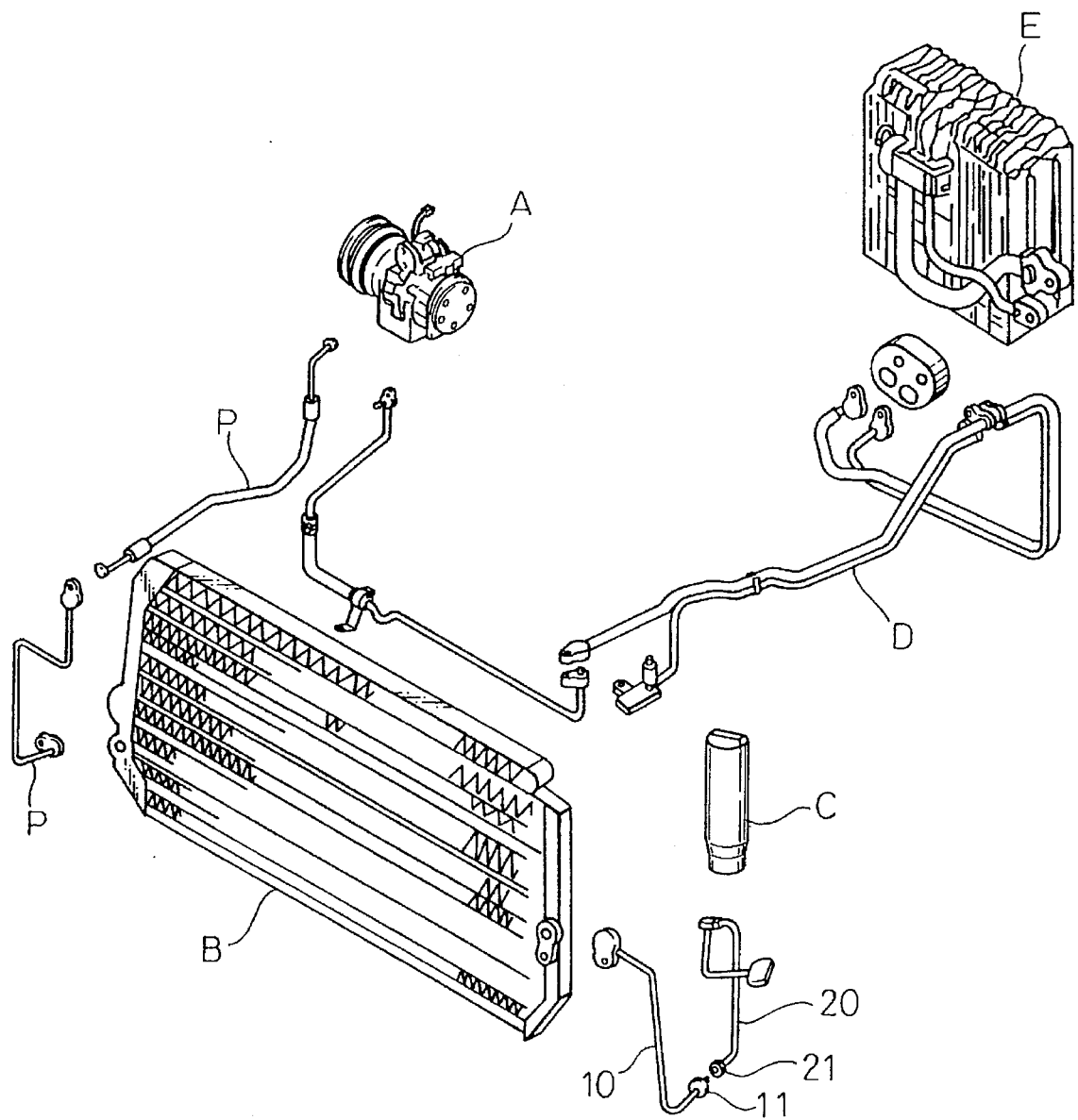
FIG. 1 is a dismantled perspective view of an air conditioning device for an automobile.
Figure 4:
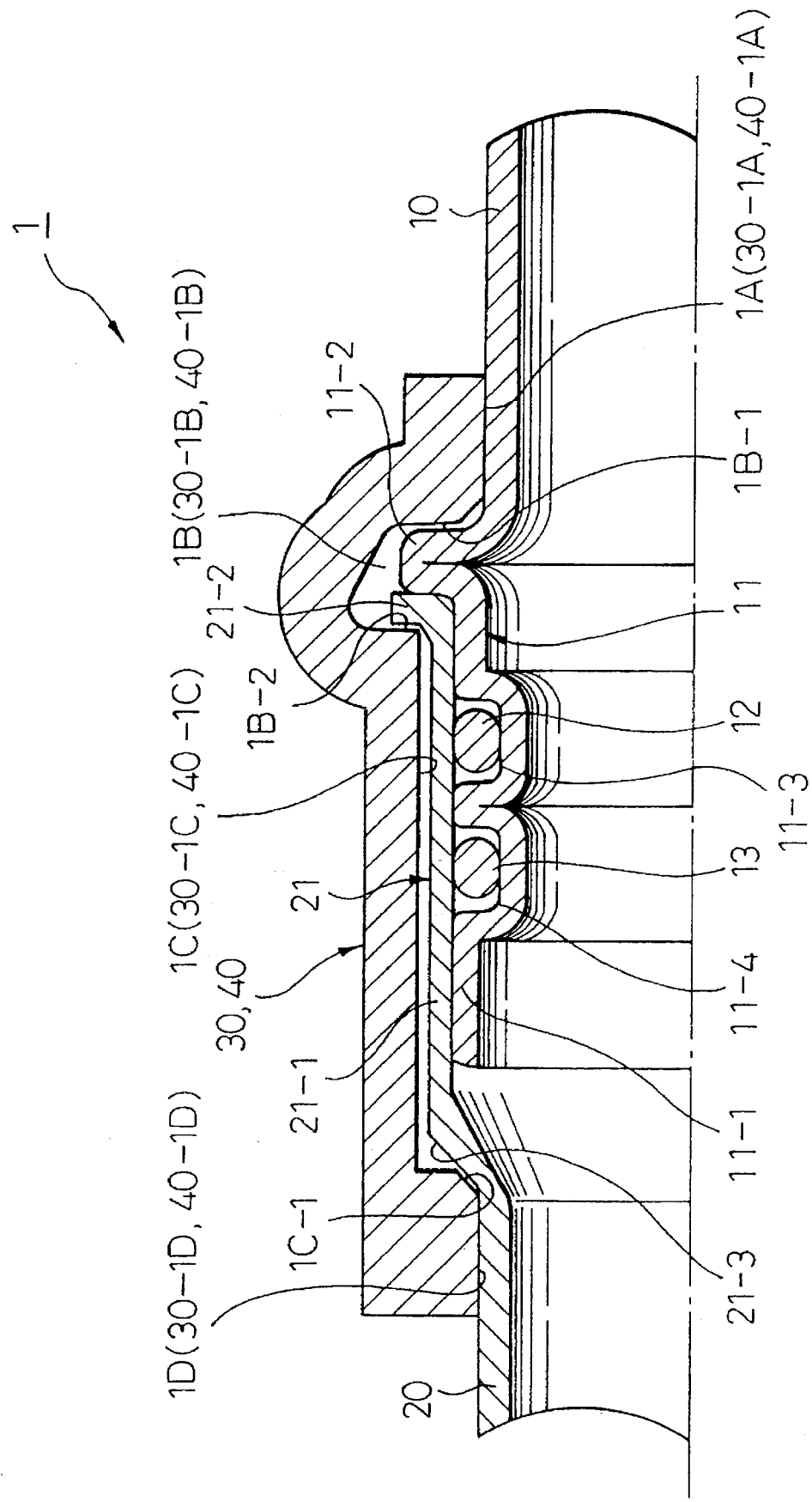
FIG. 4 is a longitudinal cross-sectional view of the couplings in FIG. 1 when they are under coupled condition, while being fixed by a fixing device according to the present invention.

FIG. 20-A is similar to FIG. 4 but illustrates a longitudinal cross-sectional view of the couplings in FIG. 1 when they are under coupled condition, while being fixed by a fixing device in FIG. 19.

FIG. 20-B is similar to FIG. 20-A but illustrates when the orientation of the fixing device is reversed.

Figure 21:
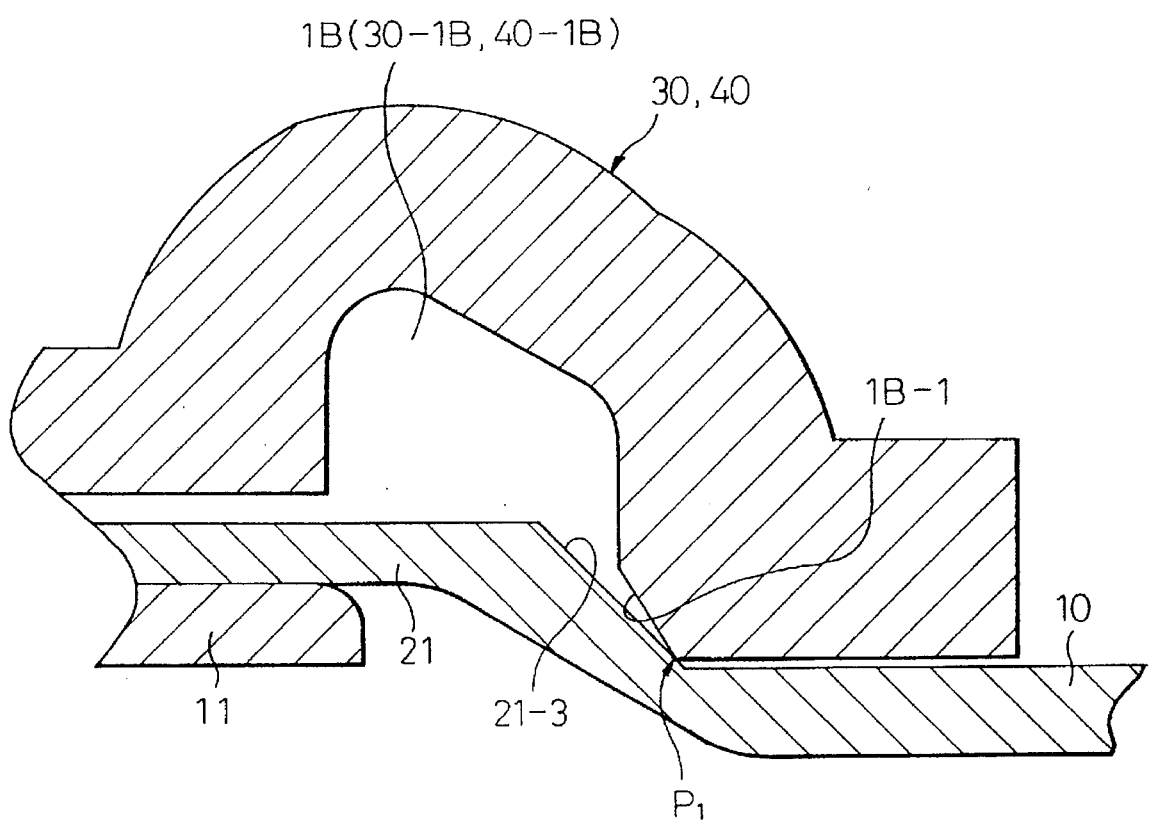

FIG. 21 shows partly couplings and fixing device in a modified arrangement of a rest portion.

Figure 22:
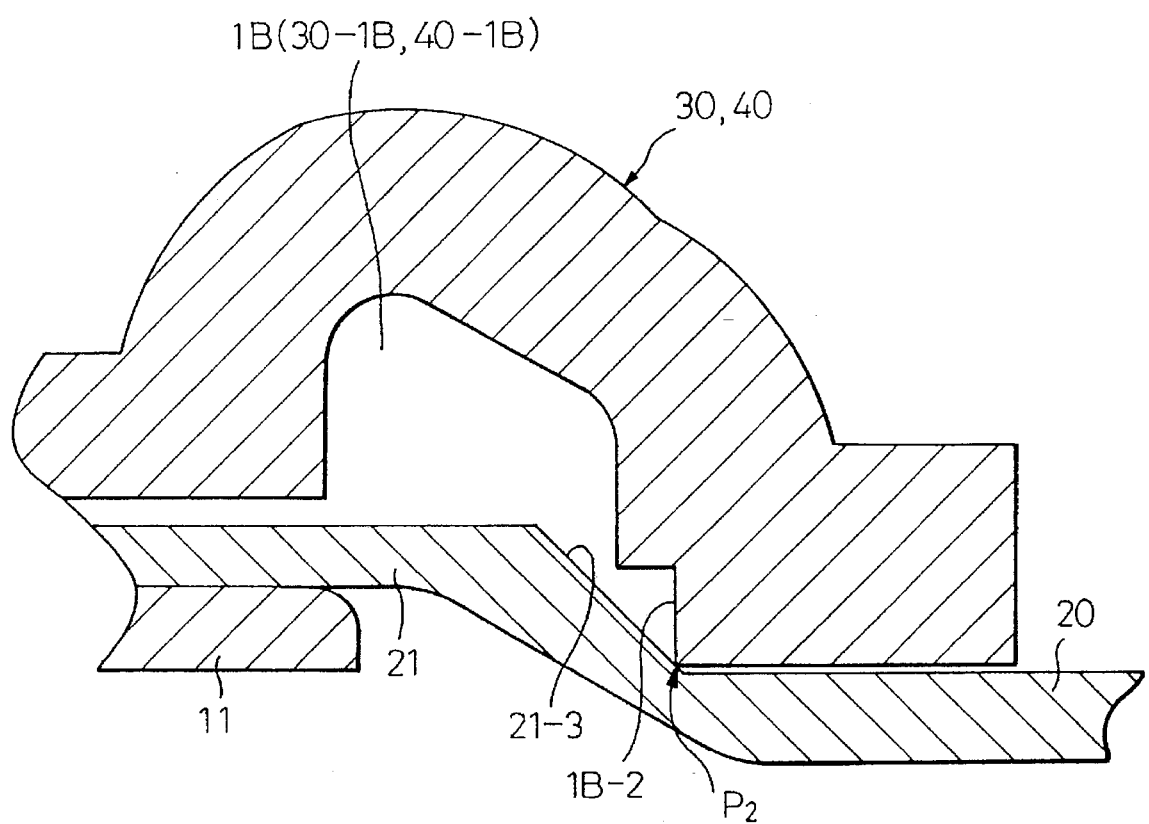

FIG. 22 is similar to FIG. 21 but shows another modification.

Figure 23:
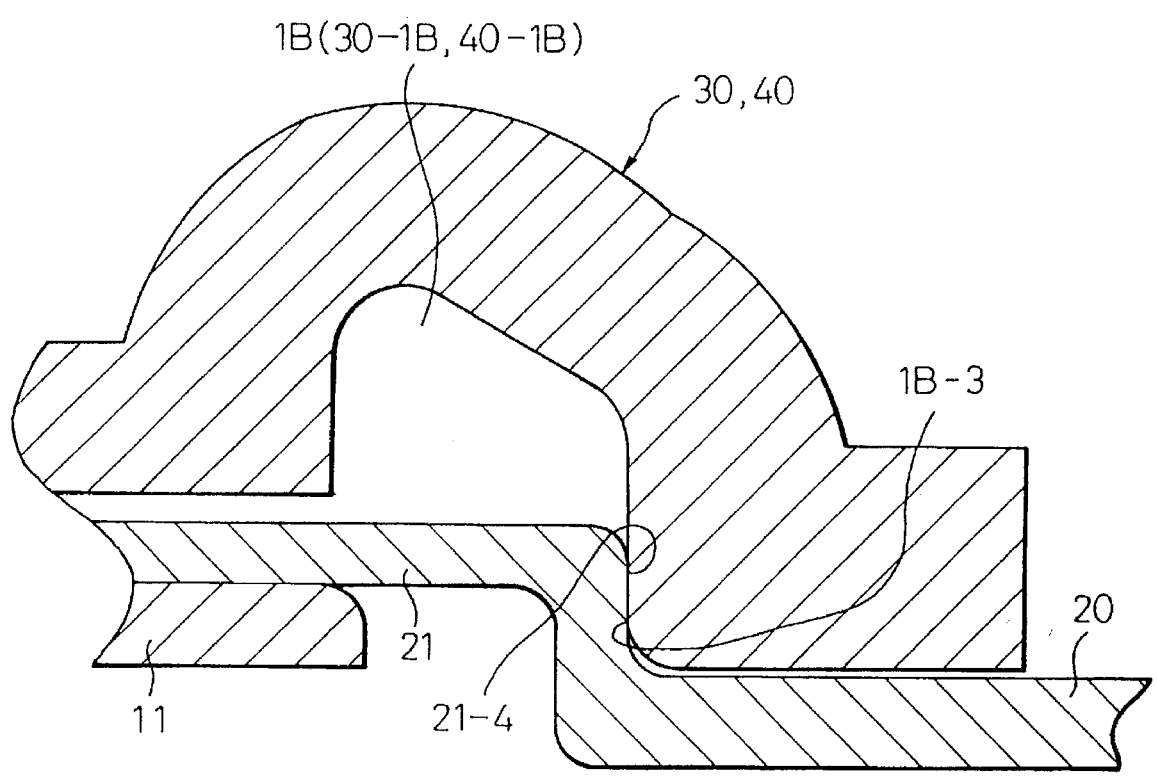

FIG. 23 is also similar to FIG. 21 but shows further another modification.

Figure 24:
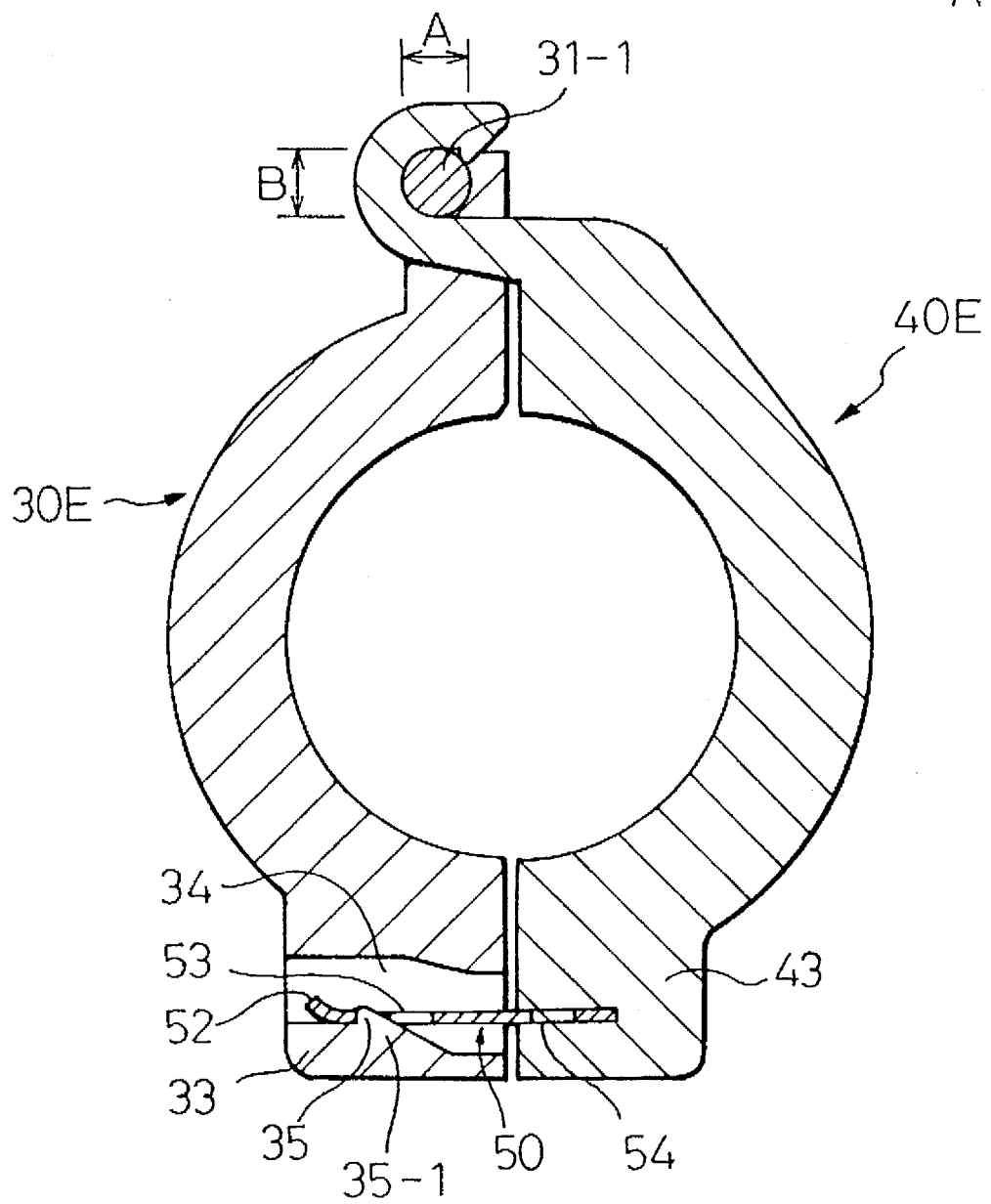

FIG. 24 is also similar to FIG. 5-A but illustrates a different embodiment provided with a means for generating a provisional detent position.

Figure 25:
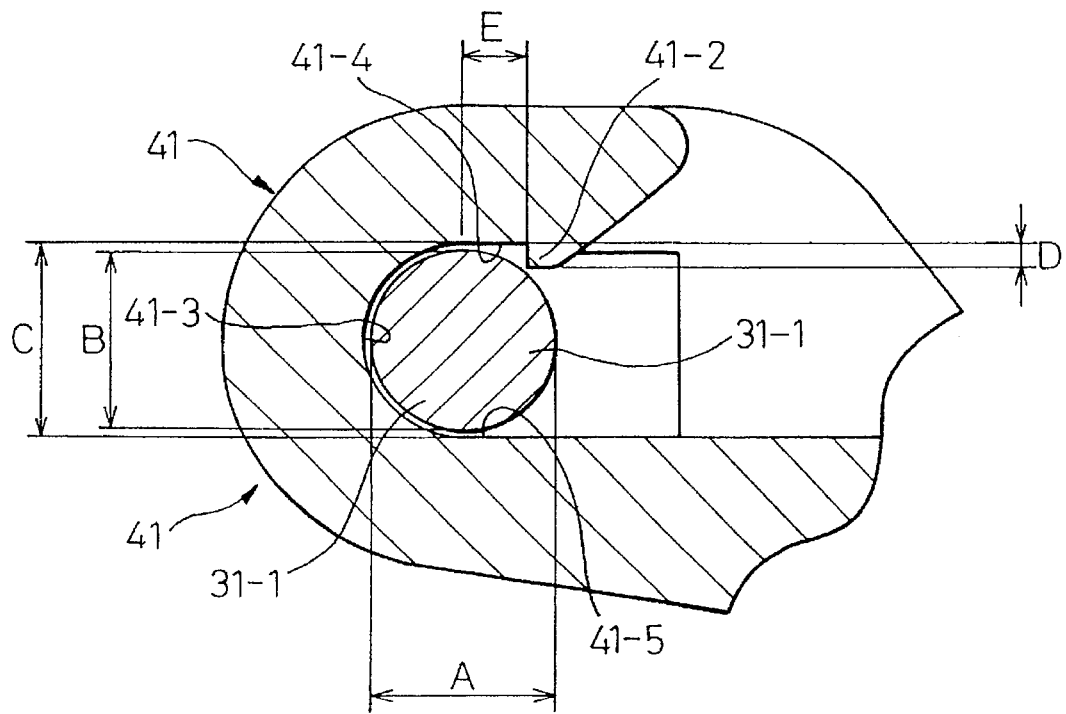

FIG. 25 is enlarged view of a part in FIG. 24 and illustrates a geometry of the hinge parts.

Figure 26:
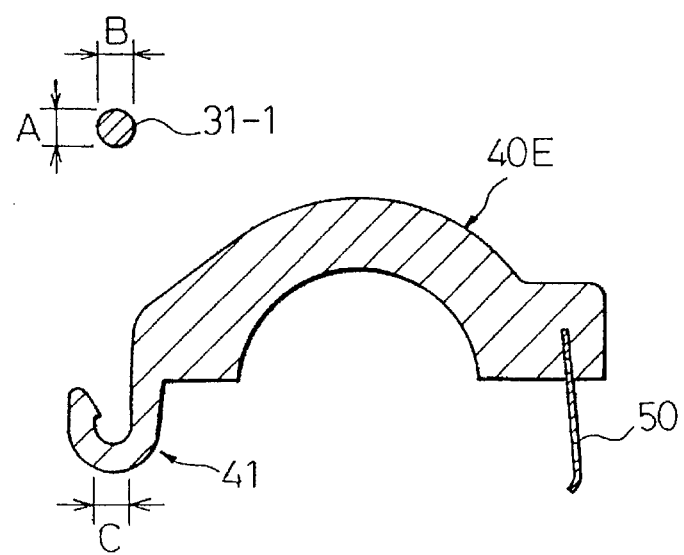

FIG. 26 is a cross-sectional view of the second fixing member in relation to the hinge shaft.

FIG. 27-A shows a relative arrangement between the first and second fixing members prior to a mutual engagement.

FIG. 27-B is similar to FIG. 27-A but shows a relative arrangement between the first and second fixing members after a mutual engagement via the hinge parts.

FIG. 27-C is similar to FIG. 27-A but shows a relative arrangement between the first and second fixing members when they are in a detent position.

Figure 29:
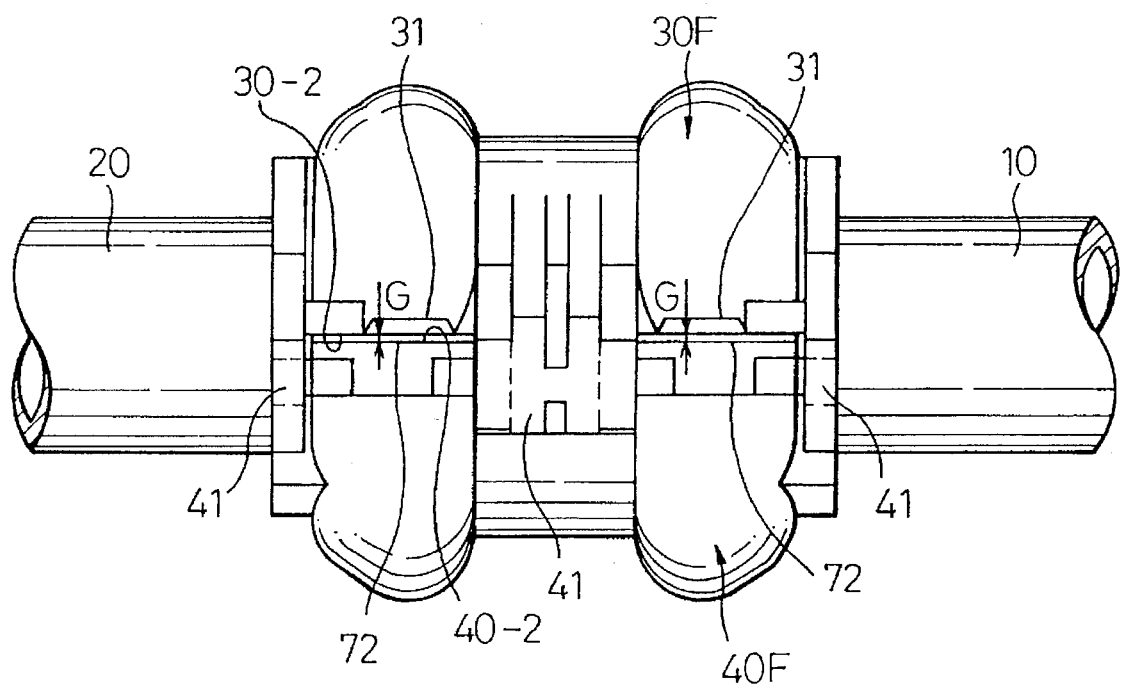

FIG. 28 is a side view of a fixing device in a different embodiment, where a means is provided for draining water in the device, FIG. 29 is a view taken along a line IXXX in FIG. 28.

Figure 30:
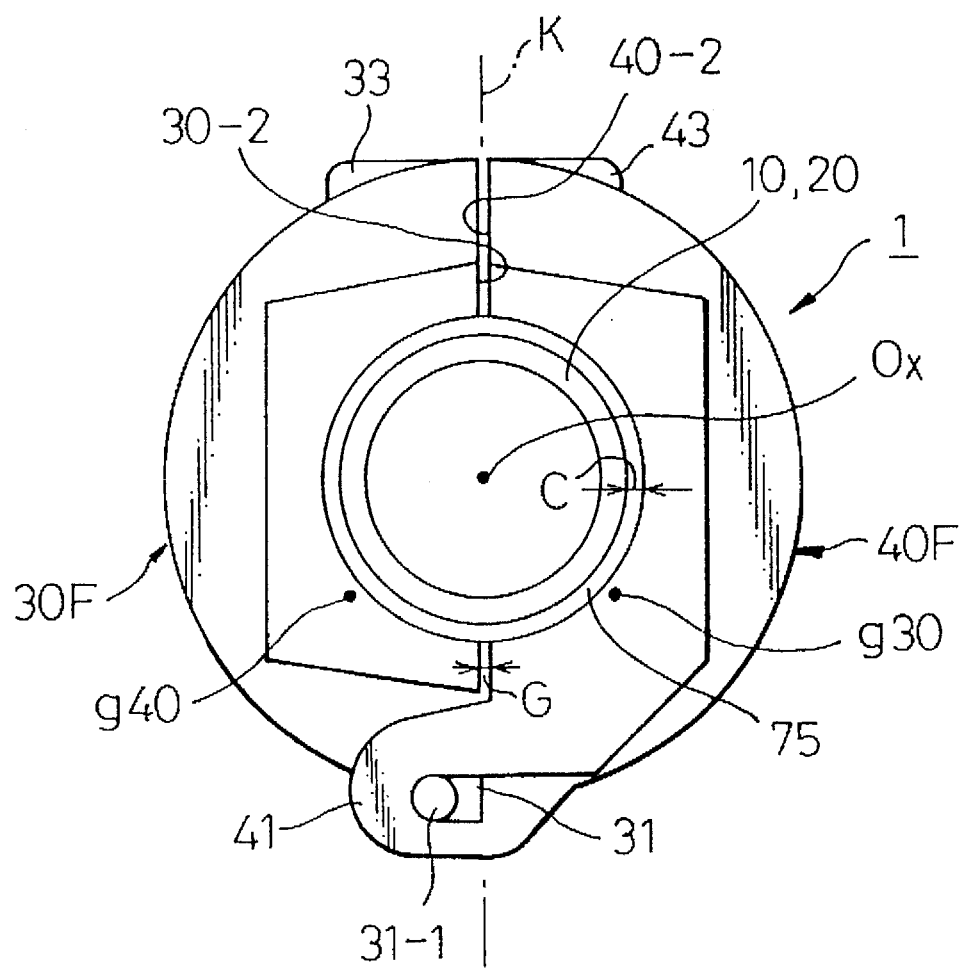

FIG. 30 is a view taken along a line XXX in FIG. 28.

Figure 31:
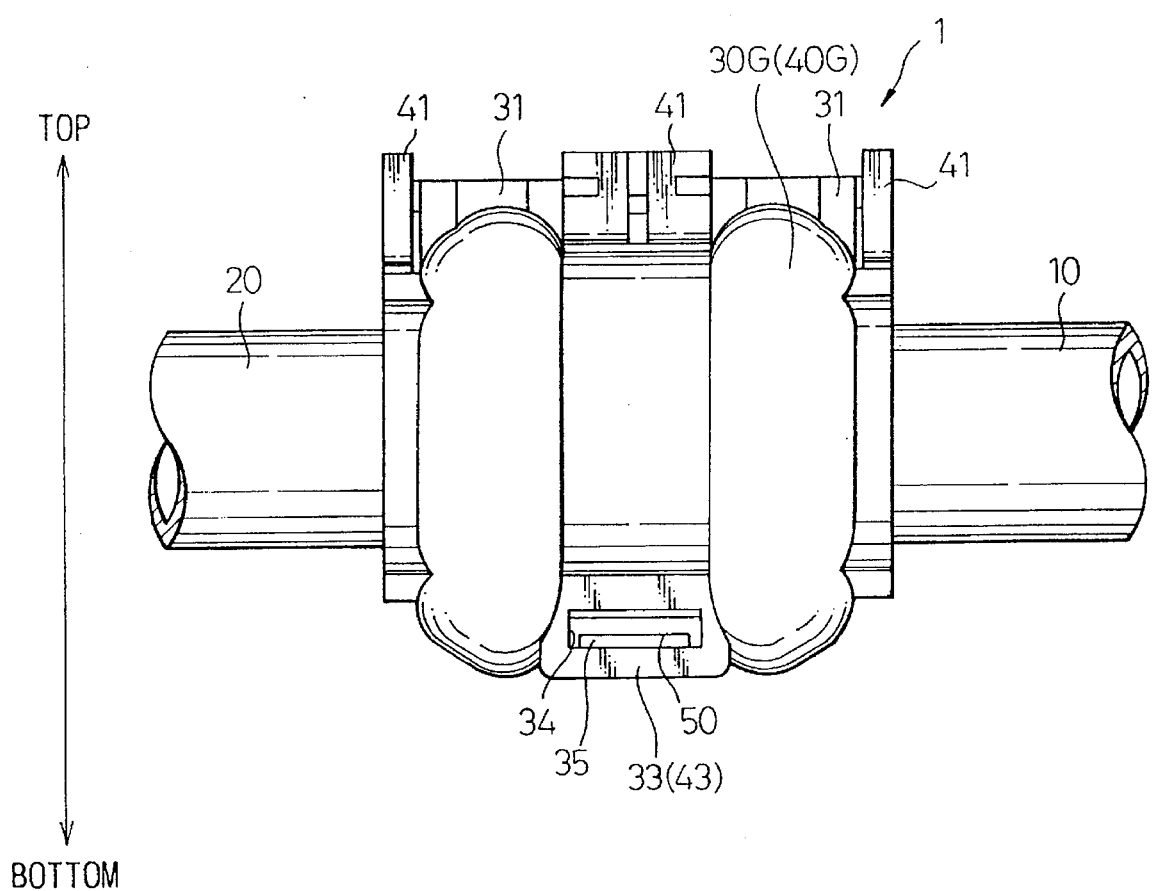

FIG. 31 is similar to FIG. 28 but illustrates a different embodiment.

Figure 32:
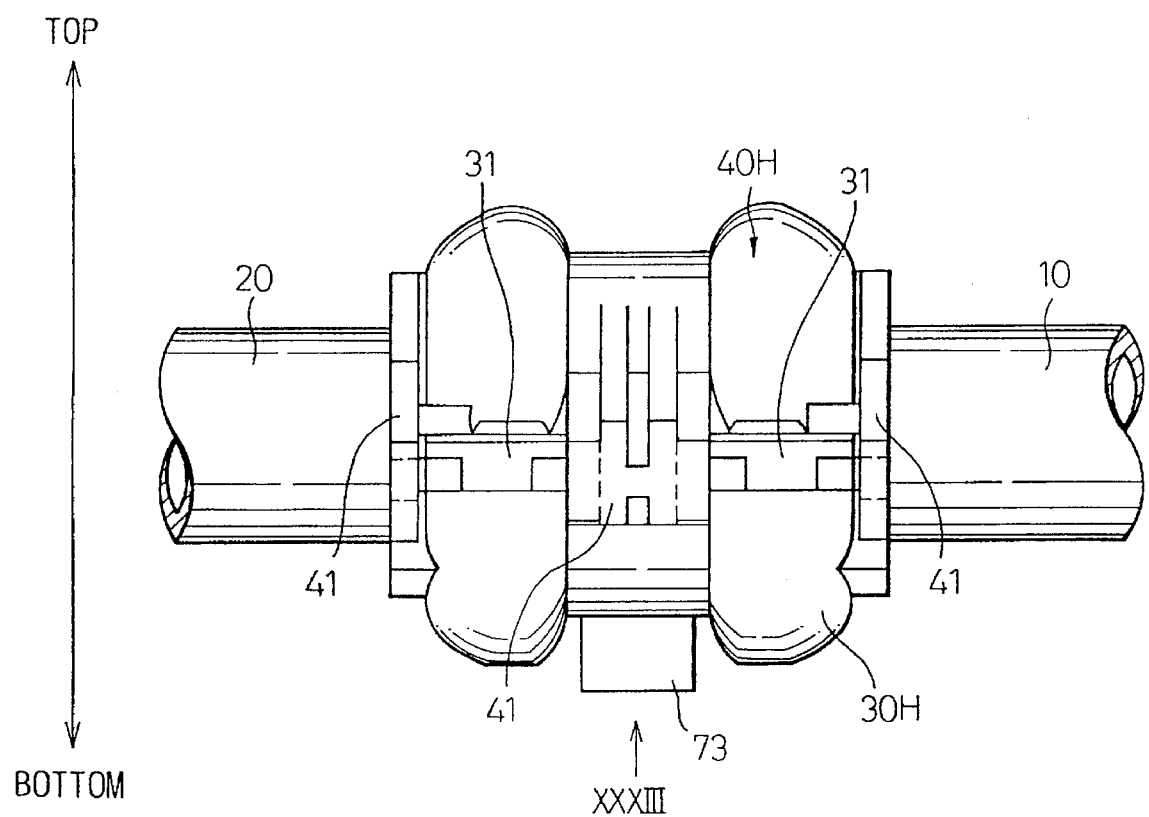

FIG. 32 is similar to FIG. 28 but illustrates a different embodiment.

Figure 33:
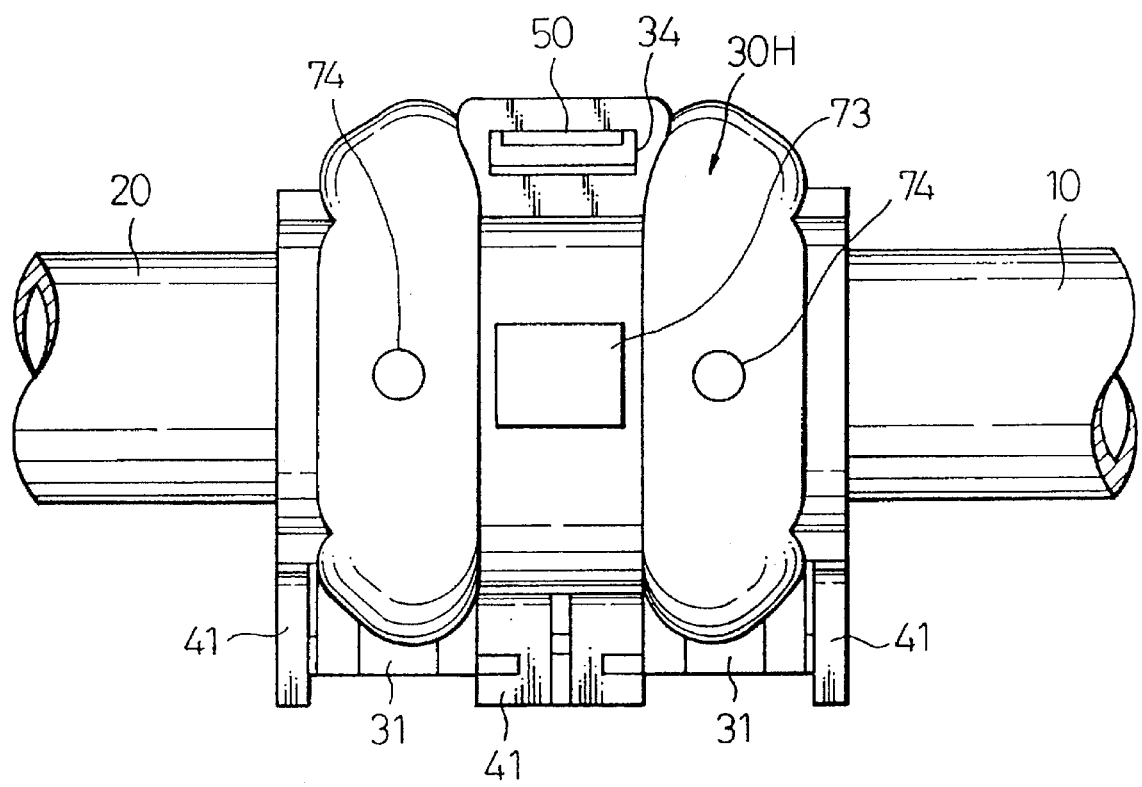

FIG. 33 is a view taken along line XXXIII in FIG. 32.

DETAILED DESCRIPTION OF PREFERRED EMBODIMENTS

First Embodiment

In FIG. 1, a refrigerating system to which the present invention is applied is shown. Namely, the refrigerating system includes a compressor A, a condenser B, a receiver C, a capillary tube D, and an evaporator E. The compressor A is connected to the condenser B via pipe P for allowing a compressed refrigerant gas to flow from the compressor B. The condenser B is connected to the receiver C via pipes 10 and 20 for allowing a condensed refrigerant to be introduced into the receiver C. The capillary tube D is for reducing the pressure of the liquid gas from the receiver. At the evaporator E the refrigerant is evaporated, and the evaporated gas is sucked into the compressor A for recirculation.

According to the present invention, a pipe fitting device is provided for connecting the pipes 10 and 20 with each other. The device includes couplings 11 and 21 integrally and concentrically formed at ends of the pipes 10 and 20, respectively, which are made of metal material such as an aluminum or steel, and a fitting device 1 including fixing members 30 and 40 for preventing the couplings 11 and 21 from being released as shown in FIG. 2

Figure 3:
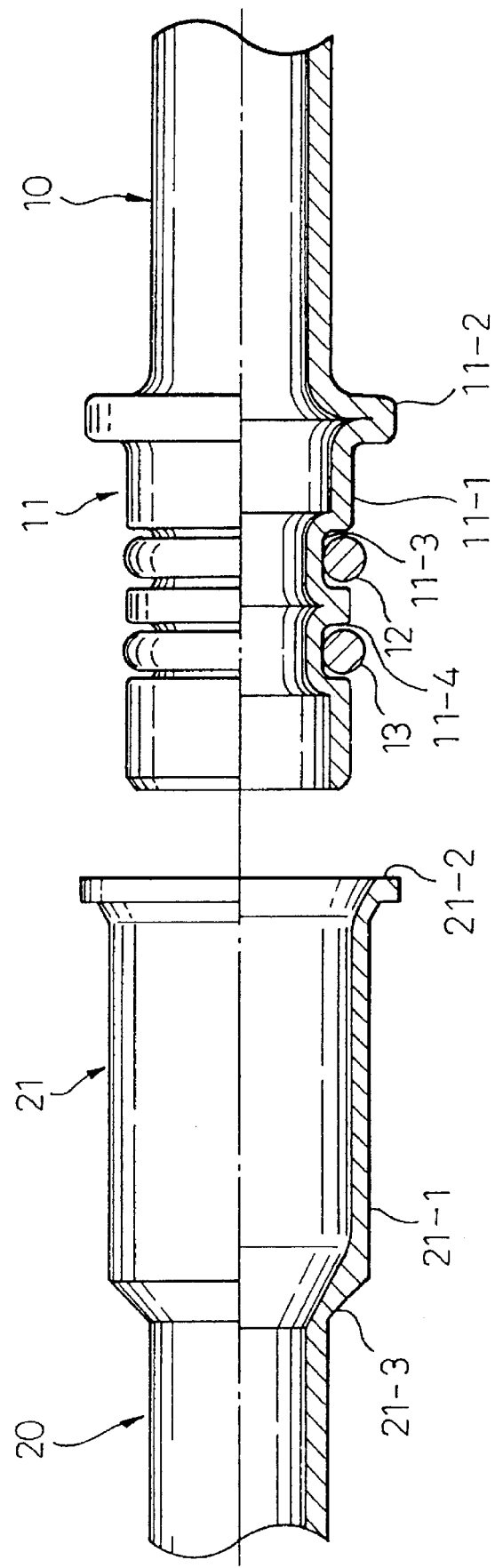
FIG. 3 is a longitudinal side view, partially sectioned, of a male and female couplings, when they are under a released condition.

In FIG. 3, the male coupling 11 is integrally formed at an end of the first pipe 10, while the female coupling 21 is integrally formed at an end of the second pipe 20. The male coupling 11 is formed with a sleeve portion 11-1 of an outer diameter which is slightly larger than that of the pipe 10, and a bulge portion 11-2 at its one end of the sleeve portion 11-1 adjacent the pipe 10. The flange portion 11-2 is formed by bulging a portion of the pipe 10 and axially crushing the bulged portion. The sleeve portion 11-1 forms, at its outer cylindrical surface, a pair of axially spaced apart annular grooves 11-3 and 11-4, to which O-rings (elastic seal members) 12 and 13 made of a rubber material are respectively fitted. The O-rings 12 and 13 are for obtaining a sealed connection of the female coupling 11 with the female couplings 21. As shown in FIG. 3, the female coupling 21 is formed with a sleeve portion 21-1 of an increased outer diameter over the pipe 20. The sleeve portion 21-1 has an inner diameter which is slightly larger than the outer diameter of the sleeve portion 11-1 of the male coupling 11, which allows the male coupling 11 to be inserted to the female coupling 21. The sleeve portion 21-1 has, at its free end, a radially extending flange portion 21-2, which is axially faced with the bulge portion 11-2 of the male coupling 11. At the end of the sleeve portion 21-1 of the increased diameter remote from the flange portion 21-2, a tapered portion 21-3 is formed which connects the enlarged diameter portion 21-1 with the pipe 20.

FIG. 4 illustrates a condition, where the male coupling 11 is inserted to the female coupling 21. Namely, in this condition, the sleeve portion 11-1 of the male coupling 11 is inserted to the sleeve portion 21-1 of the female coupling 21, until the flange portions 11-2 and 21-2 are in axial contact with each other. The O-rings 12 and 13 on the grooves 11-3 and 11-4 contact with the inner surface of the sleeve portion 21-1, thereby obtaining the desired sealed condition.

Again, in FIG. 2, the first and the second fixing members 30 and 40 are hinged with each other about an axis, which allows the device to be rotated between a closed position (FIG. 5-A) where the fixing members 30 and 40 are connected with each other for fixing the coupling and an opened position (FIG. 2) where the coupling can be released. The first and second fixing members 30 and 40 are made from a resin with a large creep strength at a high temperature, such as polybutylene terephthalate or polyphenylene sulfide containing 20 to 70% of glass.

As shown in FIG. 2, the first fixing member 30 includes a body portion 30-1 in the shape of one half of a circular cylindrical shaped member cut along an axial plane. In other words, the body portion 30-1 has a semicircular shape in a transverse cross-section. Similarly, the second fixing member 40 includes a body portion 40-1 in the shape of the other half of a circular cylindrical shaped member cut along an axial plane. In other words, the body portion 40-1 has, also, a semicircular shape in a transverse cross-section. The first fixing member 30 is formed with a first hinge having axially spaced hinge parts 31, while the second fixing member 40 also has a second hinge having axially shaped hinge parts 41. Due to the hinged connection, a relative rotating movement can be obtained between an opened condition where the first and second fixing members 30 and 40 are opened as shown in FIG. 2, and a closed condition where the first and second fixing members 30 and 40 are closed as shown in FIG. 5-A. The first hinge (hinge parts 31) and second hinge (hinge parts 41 and 42) are connected with each other by means of hinge shafts 31-1. Namely, as shown in FIG. 6-A, in the first fixing member 30, each of the hinge parts 31 has an opposite end surface transverse to the axis of the coupling, from which surfaces the respect hinge shafts 31-1 extend integrally in cantilever fashion. In other words, four hinge shafts 31-1 are provided, while they form a common hinge axis K. As shown in FIG. 5-A, the hinge part 41 of the second fixing member forms a substantially U cross-sectional shape, which is engaged with a corresponding hinge shaft 31-1 extending outwardly from the hinge part 31 of the first fixing member 31. Similarly, the middle hinge part 42 of the second fixing member 40 forms, also, a U cross-sectional shape, which allows the hinge axis 31-1 extending inwardly from the hinge parts 31 to be engaged with the U cross-sectional parts. Thus, a hinge connection between the hinge parts 31 of the first fixing member 30 and the second fixing member 40 is created. As shown in FIG. 5-A, the U cross-sectional shape of the hinge parts 41 and 42 is such as to form a radially inwardly projected portion 41-2, which functions to create an opening which is slightly smaller than the outer diameter of the hinge shaft 31-1. As a result, a snap fitting of the hinge shaft 31-1 to the corresponding hinge part 41 of the U cross-sectional shape is realized, thereby preventing the hinge shaft 31-1 from being withdrawn from the hinge part 41.

In the above construction of the hinge device between the first fixing member 30 and the second fixing member 40, a cantilever fashion of the hinge shafts 31-1 is employed. Namely, as shown in FIG. 6-A, the hinge shafts 31-1 of a short length extend from opposite axial end surfaces, to which shafts 31-1 the respective hinge part 41 of the second fixing member 40 engage. In other words, a hinge connection between the fixing members 30 and 40 is done at axially spaced apart four point (four hinge shafts 31-1). This arrangement of axial distribution of the hinge points is advantageous in that a shearing force applied between the first and second fixing members 30 and 40 during their closed condition can be evenly distributed between the four hinge points. Namely, during the use of the fixing device 1 for fixing the coupling, a force due to the fluid pressure is generated so that the first and second fixing members are spaced in a direction transverse to the coupling axis. Thus, above-mentioned shearing force is generated in the hinge device in a direction for separating the fixing members 30 and 40. The provision of the four short shafts 31-1 according to the above embodiment is effective for evenly distributing the shearing force to the axially spaced shaft, thereby preventing the shafts 31-1 from being excessively loaded. Contrary to this, in FIG. 6-B, only a shingle hinge shaft 31-1' is provided for integrally connecting the supporting parts 31. In this case, the above-mentioned shearing force may be concentrated to the single hinge shaft 31-1'. Thus, a solution such as increasing the diameter of the shaft 31-1' would be necessary for preventing the shaft 31-1' from being damaged.

It should be noted that the construction in FIG. 6-A is advantageous from the view point of a molding from a thermoplastic resin. Namely, during a molding from the resin, one directional flow of melt resin is obtained from a cavity in the mold for forming the hinge part 31 to a cavity in the mold for forming the shaft 31-1. Thus, a desired quality of the molded part (shaft 31-1) is obtained. Contrary to this, during the molding process of the product in FIG. 6-B, opposite flows of melt resin are obtained in a cavity for forming the shaft 31-1'. In this case, at a location where the opposite flows of the resin are contacted (welded), a defect is likely to be generated at the welded location such that the integration of molded resin material is insufficient.

When the fixing member 30 and the second fixing member 40 are in the closed condition in FIG. 4, the fixing device 1 forms, therein, a first circular cylindrical space 1A having a diameter slightly larger than an outer diameter of the pipe 10, a second circular cylindrical space 1B having a diameter slightly larger than an outer diameter of the flanges 11-2 and 21-2, a third circular cylindrical space 1C of a diameter slightly larger than an outer diameter of the sleeve portion 21-1 of the female coupling 21, and a fourth, circular cylindrical space 1D of a dimension slightly larger than the outer diameter of the tube 20. These chambers 1A, 1B, 1C and 1D are axially aligned and in communication with each other.

As shown in FIG. 2, the body portion 30-1 of the first fixing member 30 forms a first semicircular recess 30-1A, a second semicircular recess 30-1B, a third semicircular recess 30-1C, and fourth semicircular recess 30-1D. Similarly, as to the body portion 40-1 of the second fixing member, a plurality of semicircular recess 40-1A, 40-1B, 40-1C and 40-1D are formed so that they are paired with the recess 30-1A to D, respectively. When the first and second fixing members 30 and 40 are combined, the corresponding pairs of the recess 30-1A and 40-1B, 30-1B and 40-1B, 30-1C and 40-1C, and 30-1D and 40-1D form the chambers 1A, 1B, 1C and 1D, as shown in FIG. 4.

As shown in FIG. 2, the first fixing member part 30 has, at a diametrical end opposite the hinge part 31, a first fitting part 33 forming with a rectangular shaped engaging recess 34 which extends axially and opened at the diametrical dividing surface. As shown in FIG. 5-A, the recess 34 is formed with a radially outer inner surface 34-1. An axially extending catch 35 of a cross-sectional shape of a right triangle is formed on the inner surface 34-1 (FIG. 5-A) so as to be radially inwardly projected. The catch 35 has an inclined surface 35-1, which is rearwardly inclined with respect to the direction of the movement of the second fixing member 40 for the latter to be combined with first fixing member 30. Namely, in FIG. 5-A, the inclined surface 35-1 climbs further as it is located away from the diametrical or divisional surface 30-2 of the fixing member 30, which allows the engagement to be easily done, as will be described later.

The second fixing member 40 has, at the diametrical end opposite the hinge part 41, a fitting part 43, in which a latch member 50 having a latch opening 53, of a closed shape, extending transversely with respect to a diametric divisional surface 40-2 of the second fixing member 40. The latch member 50 is formed as a spring sheet made of stainless steel having a desired elasticity. The latch member 50 is, as describe later, insert molded in the fitting part 43 of the second fitting part 40. The latch member 50 is formed with a latch hole 53 adapted for an engagement with the catch 35 of the first fixing member 30. The latch member 50 is further formed with an opening 54 in the fitting part 43, which prevents the latch member 50 from being withdrawn. The latch member 50 is, at its outer end 52, slightly bent away from the surface 35-1, which makes it easy for the latch member 50 to be smoothly engaged with the catch 35 during the closing operation of the fixing device 1.

When the device in the first embodiment is used, the male coupling 11 is inserted to the female coupling 21 via the O-rings 12 and 13 as shown in FIG. 4. Then, as shown in FIG. 2, the combined couplings 11 and 21 are placed on the fixing member 40 or the fixing member 30. Then, the fixing member 30 (or fixing member 40) is rotated about the hinge shaft 31-1 toward the fixing member 40 (or the fixing member 30). As a result, a closed construction of the device is obtained, where the semicircular recess 30-1A to 30-1D in the first fixing member 30 are combined with respective semicircular recess 40-1A to 40-1D in the second fixing member 40. As a result, as shown in FIG. 4, a complete set of chambers 1A, 1B, 1C and 1D are created, in which the pipe 10, the flange 11-2 of the male coupling 11 and the flange 21-2 of the female coupling 21, the sleeve portion 21-1 of the female coupling 21, and the pipe 20 are respectively stored. During the relative rotating movement between the first and second fixing members 30 and 40 about the hinge axis, as shown in FIG. 5-A, the resilient latch member 50 of the second fixing member 40 is inserted to the opening 34 of the first fixing member 30, so that the bent end 52 is, first, engaged with the inclined surface 35-1 of the catching catch 35, the bent end 52 then climbs on the surface 35-1, and, finally, the latch 50 engages, at its catching opening 53, with the catch 35 as shown in FIG. 5-A, thereby obtaining a positive lock between latch 50 and the catch 35. Namely, a vertical wall 35-2 of the catch 35 prevents the latch 50 from being disengaged from the catch 35, thereby obtaining a positive locking operation. Due to such a locking operation, the first and second fixing members 30 and 40 can maintain their closed condition, thereby radially enclosing the coupling members 11 and 21, while axially fixing the coupling members 11 and 21.

Namely, during use, the pressure of the fluid in the pipes 10 and 20 urges the male and female coupling members 30 and 40 to be axially separated. However, the male and female coupling members 11 and 21 contact, axially, the fixing members 30 and 40, thereby preventing the coupling members 30 and 40 from being axially separated. Namely, when the fluid pressure is applied for urging the members 30 and 40 to be separated, the male coupling 11 contacts, at the flange portion 11-2, the fixing member 30 and 40, while the female coupling 21 contacts, at its tapered wall 21-3 or the flange portion 21-2, the fixing member 30 and 40. Namely, the flange portion 11-2 contacts a radially extending stopper surfaces 1B-1 adjacent the chamber 1B. Contrary to this, the flange portion 21-2 contacts a stopper surface 1B-2 adjacent the chamber 1B, or the taper outer surface 21-3 contacts a tapered inner surface 1C-1 adjacent the chamber 1C. As a result, the couplings 11 and 21 are prevented from separating. In this construction of the first and second fixing member 30 and 40, two axially spaced apart axial rest portions are provided with respect to the female coupling 21. Namely, the fixing members 30 and 40 contact axially with the female coupling 21 at the flange portion 21-2 as well as at the tapered wall portion 21-3. Due to a provision of the axially spaced two rest portions in the female coupling 21 with respect to the fixing members 30 and 40, a positive fixation of the female coupling 21 with respect to the fixing members 30 and 40 is obtained. Namely, an increase of the pressure of the refrigerant (fluid pressure) in the pipes 10 and 20 applied continuously or repeatedly causes the female coupling 21 to be axially displaced with respect to the fixing members 30 and 40, which causes the flange portion 21-2 to be engaged with the faced radially extending surface 1B-2, and the tapered wall 21-3 to be engaged with the tapered surface 1C-1 and the tapered wall. Thus, a load applied between the female coupling 21 and the fixing members 30 and 40 is axially divided into two rest portions, thereby reducing the deformation of the coupling member 21, thereby preventing the coupling 21 from being withdrawn.

When the coupling device is to be released when the refrigerant does not flow in the pipes 10 and 20, a tool such as a screwdriver of a flattened cross-sectional shape is inserted to a diametrical gap G (FIG. 5-A) between the faced surfaces 30-2 and 40-2 of the fixing members 30 and 40, so that the latch member 50 is displaced until its hold 53 is disengaged from the catching catch 35, thereby releasing the locked condition, which allows the fixing members 30 and 40 to be opened as shown in FIG. 5-B or FIG. 2.

According to the first embodiment, a fixation of the couplings can be done only by a relative rotating movement between the first and second fixing members 30 and 40 about the hinge axis, thereby increasing labor productivity.

Molding Device for First Embodiment

FIGS. 7 to 10 illustrate how an insert molding of the second fixing member 40 in the fixing device 1 is done. FIG. 7 shows a mold device M which includes a core mold 60, a cavity mold 70 and a slide mold 80. A sealed cavity 90, which has a cross-sectional shape corresponding to that of the second fixing member 40 in FIG. 5-A, is created by the molds 60, 70 and 80. Namely, the core mold 60 and the cavity mold 70 have a separation plane S, and define recess and core portions which form the cavity 90. Thus, the core mold 60 and the cavity mold 70 are relatively moved, in a direction X, transverse to the mold separation plane S. In order to attain this relative movement, guide rails (not shown) are provided. The mold 60 is further formed with a rectangular recess 61, in which the slide mold 80 moves in a direction Y parallel to the mold separation planes S. A guide pin 71 is projected out of the surface 70-1 of the cavity mold 70, while the guide pin 71 being inclined with the mold separation plane S. The guide pin 71 engages a guide hole 80-1 formed in the slide mold 80. As the cavity mode 70 is moved away from the core mold 60, the slide mold 80 is moved downwardly in FIG. 7, as will be described later. In order to obtain a smooth slide movement between the slide mold 80 and the guide pin 71, the inner diameter of the guide hole 80-1 is slightly larger than the outer diameter of the guide pin 70.

The recess 61 forms, at inner end, a plain wall 62, which extends transverse to the mold separation plane S. The slide mold 80 has, at the end wall 81 extending transverse to the mold separation plane S and opposite the wall 62 of the sliding recess 61, a step shaped groove 81-1 of a width corresponding to the width of the latch 50, while the wall 62 opposite the groove 81-1 forms a stepped projection 62-1 of a width corresponding to that of the latch 50, which is partly projected into the opposite groove 81-1, so that the latch 50 is held between the faced surfaces of the groove 81-1 and the projection 62-1, in such a manner that its end remote from the bent end 52 together with the anti-withdrawal opening 54 is projected into the cavity 90. Namely, the groove 81-1 has a bottom surface which extends transverse to the mold separating plane S, which is in parallel to the X-direction. Furthermore, the latch 50 is sealingly held between the bottom of the groove 81-1 and the opposite stepped part 62-1. As a result, a liquid seal of the groove 81-1 with respect to the cavity 90 is obtained, thereby firmly holding the latch in the mold, on one hand, and preventing molten material from leading into the space between the groove 81-1 and the opposite surface of the projected portion 62-1, on the other hand.

When an injection system (not shown) is operated, a molten material therefrom is injected into the cavity 90, so that the material fills the entire space of the cavity 90 as well as the anti-withdrawal opening 54 of the latch 50. In this case, as explained above, the sealing contact of the latch 50 between faced surfaces of the core mold 60 and the slide mold 80 disconnects the cavity 90 from the groove 81-1, so as to prevent the molten material from being introduced into the groove 81-1.

When the injected material in the cavity 90 is solidified, the formation of the fixing member 40 as well of the insertion mold of the latch 50 therein are complete.

Then, as shown in FIG. 9, the cavity mold 70 is moved away from the core mold 80 in the X-direction (right-handed direction in FIG. 9) by way of the guide rails (now shown), while the latter holds the fixing member 40 as molded. As the same time, the slide mold 80 is moved away from the core mold 60 in the Y-direction (downward direction in FIG. 9), while a slide movement is obtained between the slide mold 80 and the inclined guide pin 71. Then, as shown in FIG. 10, the cavity mold 70 is moved further in the X-axis direction away from the core mold 60, so that the guide pin 71 is removed from the slide mold 80. Then, the releasing pins 65 are moved in the X-direction (right-handed direction in FIG. 10) toward the cavity mold 70, so that the molded fixing member 40 is detached from the core mold 60. During the detaching movement of the molded fixing member 40, the latch 50 rides on the stepped portion 62-1, thereby being resiliently displaced in the direction parallel to the mold separation plane S, and is, finally, released from the engagement with the portion 62-1, thereby causing the latch 50 to be returned to its neutral position which is 90 degree with respect to the diametrical plane 43-1 by its resiliency.

Second Embodiment and Mold Devices

In a second embodiment, the latch member 50 extends from the dividing plane 43-1 of a second fixing member 40A at an angle $\alpha$ slightly larger than 90 degree with respect to the diametrical end surface 40-2 as shown in FIG. 11-B. Thus, at the closed condition, the latch member 50 is slightly laterally deformed, which allows the latter to be engaged with the catch 35. This arrangement of the latch member 50 is advantageous from the view point to increase a service life of the mold device for forming the second fixing member 40, as will be fully explained later.

Now, a reference is made to FIGS. 12 to 16, which illustrates a construction of a mold device for forming the second fixing member 40A in the second embodiment.

As shown in FIG. 12, a core mold 60A and a slide mold 80A are slightly modified. Namely, the end wall 81A of the slide recess 61 of the core mold 60A forms entirely a flat plane, i.e., no stepped portion 62-1 in the mold device in FIGS. 7 to 10. Contrary to this, the slide mold 80A is formed, at the end wall 81A opposite the wall 62A of the sliding recess 61, a groove 81A-1, which cooperates with the opposite wall 62A of the recess 61 to hold the latch 50 in such manner that its end remote from the bend end 52 together with the anti-withdrawal opening 54 is projected into the cavity 90. Namely, the groove 81-1 has a bottom surface inclined with respect to the mold separating plane S for an angle α, while the tip end 52 of the latch contacts with the opposite wall 62A of the sliding recess 61. Furthermore, the latch 50 is sealingly held between the bottom of the groove 81A-1 and the opposite wall 62A of the recess 61. As a result, a liquid seal of the groove 81A-1 with respect to the cavity 90 is obtained, thereby firmly holding the latch in the mold, on one hand, and preventing molten material from leaking into the space between the groove 81A-1 and the opposite surface 62A of the sliding recess 61, on the other hand.

After the solidification of the injected material, the cavity mold 70 is moved away from the core mold 80 while the slide mold is moved away from the core mold 60A, as shown in FIG. 14, which is similar to FIG. 9 in the first embodiment. Then, as shown in FIG. 15, the cavity mold 70 is moved further in the direction away from the core mold 60A, so that the guide pin 71 is removed from the slide mold 80, and the releasing pins 65 are moved toward the cavity mold 70, so that the molded fixing member 40A is detached from the core mold 60. During the detaching movement of the molded fixing member 40A, the latch 50 is withdrawn from the recess 61, while the latch 50 is firmly held condition, due to the contact of its bent end 52 with the bottom surface 63 of the recess 61. Such a firmly held condition does not cause any galling to be generated between the end 52 of the latch 50 and the wall 63, due to the fact that the surface 62A is a flat plane which is parallel to the direction of the withdrawal of the latch member 50 and an occurrence of an excessive force between the latch member 50 and the opposite wall 62A is prevented. As a result, a relative movement of the latch 50 with respect to the core mold 60 during the mold separation process does not cause the wall 62A of the core mold 60A to be damaged by the latch 50.

In short, in the embodiment of the mold device in FIGS. 12 to 15, the surface 62A opposite to the latch 50 is formed as a flat surface, which allows the end 52 of the latch 50 moves without being laterally deformed. Thus, the removal of the molded product 40A does not generate any excessive force between the latch 50 and the opposite surface 62A, thereby preventing the surface 62A from being damaged. Thus, a prolonged life of the desired quality of the mold is obtained, on one hand, and the product separation process is easy, on the other hand. Furthermore, the groove 81A-1 on the slide mold 80A is inclined at a desired angle α, which makes it possible that the latch 50 is at its middle portion sealingly held between the wall 62A and the bottom end of the groove 81A-1 at their ends adjacent the cavity 90, during the molding. Such a sealing contact prevents the molten material from being introduced into the groove 81A-1 during the injection process. As a result, any attachment of the resin material to the latch member 50 is prevented except at the locations where the resin material is to be inserted.

FIG. 16 shows a modification a mold device from the view point of a construction of a core mold 60B and a slide mold 80B. Namely, in place of the provision of the groove 81A-1 in the slide mold 81A in the embodiment in FIGS. 12 to 15, a groove 62B-1 is formed at the bottom wall 62B of the recess 61 of the core mold 60B faced with the slide mold 80B. The wall 62B of the core mold 60B as well as the end wall 81B of the slide mold 80B are inclined with respect to the mold separation plane for the desired angle α. The groove 62B-1 has a flat bottom surface, which is parallel to the mold removal direction X. The separation between the bottom of the groove 62B-1 and the wall 62B at the ends adjacent the cavity 90 is equal to the thickness of the latch 50, thereby firmly holding the latch 50 between the core mold 60B and the slide mold 80B, while the latch 50 being inclined for the angle α with respect to the separation plane S between the molds 60B and 70.

In the above modification of the mold device, the latch 50 is firmly held between the molds 60B and 80B, while a removal of a molded product can be done without generating an excessive force between the latch 50 and the bottom of the groove 62B-1 due to the fact that the bottom is a flat plane which is parallel to the direction (X) in the removal of the latch 50. Furthermore, a desired sealing function of the molten material is also obtained, thereby preventing the molten material from being leaked into the groove 62B-1.

Third Embodiment as to Releasable Connector

FIG. 17 and 18 show a different embodiment, where, in place of a connecting means comprised by a latch and a catch, a spring connection member 200 is provided. Namely, a first fixing member 30C has, at an end portion 33 diametrically opposite to the hinge parts 31, a recess 33-3, while a fixing member 40C has, at an end portion (latch part) 43 diametrically opposite to the hinge parts 41, a recess 43-3. These recesses 33-3 and 43-3 are arranged so that they are opposite with respect to the separating plane U between the first and second fixing members 30C and 40C. The connecting member 200 is made of a plate spring of a substantially C cross-sectional shape. Namely, the connection member 200 has a first looped end 201 and a second looped end 202. In order connect the first and second fixing members 30C and 40C with each other, the fixing members 30C and 40C are brought into a contact via the separating plane U, and a connection member 200 is pushed radially inwardly while the C-shape is opened to the portions 33 and 43, thereby causing the first end 201 to be engaged with the recess 33-3 and the second end 202 with the recess 43-3.

In order to disconnect the first and second fixing members 30C and 40A, a tool such as a flat screwdriver is inserted to the recess 33-1 or 43-3, thereby disengaging the end 201 or 202 of the spring 200.

Fourth Embodiment as to Non-directional Fixing Member

In FIG. 19, a first and second fixing members 30D and 40D are slightly different from the previous ones in that these members have a semicircular inner cylindrical surface of an axially symmetrical arrangement. Namely, as to the first fixing member, in addition to the recess 30-1B of a largest depth for receiving the flanges 11-2 and 22-2, a semicircular recess 30-1B' is further provided to obtain the axially symmetrical arrangement of the shape of the inner surface. Similarly, as to the second fixing member 40D, its inner semicircular cylindrical shape is axially symmetrical. Namely, in addition to the recess 40-1C of a largest depth for receiving the flanges 11-2 and 22-2, a semicircular recess 40-1B is further provided.

In this modified embodiment of the present invention, the arrangement of the coupling with respect to the fixing member becomes direction-less. Namely, in FIG. 20-A, the flange portions 11-2 and 21-2 of the couplings 10 and 21 are arranged in a chamber 1B defined by the recess 30-1B and 40-1B of the fixing members 30D and 40D, while the tapered wall 21-3 of the female coupling 21 engages tapered surfaces 1C-1 adjacent the recess 30-1B' and 40-1B' of the fixing members 30D and 40D. In this case, the female coupling axially contacts the fixing members 30D and 40D at two axially spaced rest portions (21-2 and 21-3). FIG. 20-B is a reverse arrangement of the coupling with respect to the fixing members 30D and 40D, where the flange portions 11-2 and 21-2 of the couplings 11 and 21 are arranged in a chamber 1B' defined by the recess 30-1B' and 40-1B' of the fixing members 30D and 40D, while the tapered wall 21-3 of the female coupling 21 engages tapered surfaces 1B-1 at the bottom of the recess 30-1B and 40-1B of the fixing members 30D and 40D.

Modifications to Axial Rest Portion of Female Coupling

In FIG. 4, at the rest portion faced with the tapered surface (rest part) 21-3 of the female coupling 21, the fixing members 30 and 40 have tapered inner surfaces 1C-1 which are complimentary with the tapered surface 21-3. Namely, the tapered surface 1C-1 of the fixing members 30 and 40 and the tapered surface 21-3 of the female coupling 21 have the same angle. In this case, an increase in the inner fluid pressure of the coupling causes a wedge function to be generated between the tapered surfaces, which causes a radial force to be generated which causes the fixing members 30 and 40 to be radially deformed and which causes the members 30 and 40 to be damaged. In a modification in FIG. 21, with respect to the tapered surface 21-3, the tapered surface at the rest portion 1B-1 adjacent the chamber 1B has a larger inclination angle. Namely, in place of a plane contact, a "line" contact along a circumferential direction is obtained at a point $P_1$ between the surfaces 21-3 and 1B-1. As a result, an occurrence of the wedge function between the surfaces 21-3 and 1B-1 are less likely, thereby preventing the fixing members 30 and 40 from being deformed.

In a modification in FIG. 22, in place of a tapered surface in the previous embodiments, the rest portion is formed by a stepped surface. Namely, at the rest portion, adjacent the chamber 1B, a radially extending surface 1B-2 is formed, so that a "line" contact of the fixing member 30 and 40 with respect to the tapered surface 23-1 of the female coupling 21 is obtained at the point $P_2$.

In a modification in FIG. 23, in order to prevent the wedge function, the female coupling has a radially extending end surface 21-4, while, adjacent the chamber 1B, a radially extending surfaces 1B-3 is formed which is in face to face contact with the surface 21-4. This modification is suitable when the coupling 21 is made from a metal material such as an aluminum. Contrary to this, such a formation of the radially extending rest surface is difficult when the coupling is to be made from a plastic resin.

Embodiment of Provisional Locking of Fixing Member

An embodiment shown in FIGS. 24 to 28 features a means for provisionally locking the fixing device at an intermediate position. Namely, in FIG. 24, this embodiment is directed to a provisional locking of a fixing device in its intermediate position during transportation thereof.

In this embodiment, as similar to the previous embodiment, a fixing device is constructed by a first and second fixing members 30E and 40E (FIG. 24), and features a cross-sectional shape of a hinge shaft 31-1 that is not circular but is an elongated circle or an ellipse. Namely, as shown in FIG. 25 or 26, the hinge shaft 31-1 has a elliptic cross-sectional shape having a long axis of length A and a short axis of length B, where a relationship between A and B is roughly A=1.2 B. The second fixing member 40E has a hinge part 41 of substantially U cross-sectional shape, having an inner diameter C, where a relationship of $B<C \leq A$ is obtained, which allows the hinge shaft 31-1 to be suitably fitted to the hinge part 41, while a relative rotation between the fixing members 30E and 40E is allowed. Actually, it is desirable that the inner diameter of the hinge part 41 is the length A of the long axis minus 0.1 to 0.2 mm. As explained with reference to FIG. 5-A, the hinge part 41 is formed with an opening of U cross-sectional shape, and is further provided with a radially inwardly extending projection 41-2, which allows the shape 31-1 to be snap-fitted to the U-shaped opening. The U cross-sectional shaped opening is formed by a semicircular portion 41-3 of the inner diameter C, a straight portion 41-4 which is tangential to the circular portion 41-2 and is connected to the radial projection 41-2, and a straight portion 41-5 which is also tangential to the circular portion 41-2 and which is in parallel with respect to the straight portion 41-4. The straight portion 41-4 has a length of E. These portions A to E have, for example, the following dimensions:

A=2.6 mm
B=2.3 mm
C=2.5 mm
D=0.3 mm
E=0.8 mm

FIGS. 27-A, 27-B and 27-C illustrate how the first and second fixing members 30E and 40E are connected. Namely, FIG. 27-A shows a relative position between the first and second fixing members 30E and 40E when the connection is commenced. Namely, as shown in FIG. 27-A, in the cross section of the hinge shaft 31-1, the long axis A of the ellipse extend transverse to the divisional surface 30-2 of the fixing member 30E. Contrary to this, the U-shaped opening of the hinge part 41 of the second fixing member 40E is opened transversely to a diametrical divisional surface 40-2 of the second fixing member 40E. In FIG. 27-A, the first and second fixing members 30E and 40E are arranged so that the diametric divisional surfaces 30-2 and 40-2 of the fixing members 30E and 40E are parallel, while the U-shaped opening of the hinge part 41 is opened to the hinge axis 31-1. A relative movement of the members 30E and 40E toward each other easily causes the projection 41-2 to be radially outwardly displaced by means of the short axis B which is slightly larger than the dimension of the U-shaped opening of the hinge part 41 at the projection 41-2, which allows, finally, the hinge shaft 31-1 to be snap fitted to the U-shaped opening of the hinge part 41, as shown in FIG. 27-B. Namely, as shown in FIG. 25, in the cross section of the hinge shaft 31-1, the short axis B extends transverse between the straight portions 41-4 and 41-5, the distance between which is C which is larger than B. Thus, a relatively loose fit condition is obtained, while the existence of the radially extending projection 41-2 prevents the hinge shaft 31-1 from being withdrawn.

In FIG. 27-C, a relative rotation of 90 degree is done from the position in FIG. 27-B, where the long axis A of the hinge shaft 31-1 extends parallel to the diametrical divisional surface 40-2 of the fixing member 40E. In other words, in the U cross section of the hinge part 41 in FIG. 25, the long axis A extends vertically to the straight parts 41-4 and 41-5 spaced at the distance C, which is smaller than A. As a result, a "click stop or detente" condition is obtained, where a relatively tight fitted condition is obtained between the hinge shaft 31-1 and the hinge part 41, which allows a provisional fixing force to be generated, so that the members 30E and 4-E are held at the relative position in FIG. 27-C.

This provisionally fixed force allows the first and second fixing members 30E and 40E to be positively maintained at the condition shown in FIG. 27-C irrespective of an outside force caused, for example, by vibration during the transportation of the fixing device. At the sites where an assembly (connection of pipes) are done, a manual force for overcoming the provisional fixing force between the hinge shaft 31-1 and the hinge part 41 is applied which causes a relative rotation to be commenced between the first and second fixing member 30E and 40E, to the closed position in FIG. 24.

A connection of refrigerating pipes by using the coupling and the fixing device according to the present invention will be done at an automobile factory or an automobile dealer. According to the present invention, a transportation of the fixing device is done while it is held at the provisional locked state in FIG. 27-C. Thus, at a factory, what is needed for an operator is merely applying an additional force for releasing the provisional locked state and for bringing it to a fully engaged condition as shown in FIG. 24. If no such provisional locked state is not provided, during the transportation, the fixing device may automatically take a fully locked condition in FIG. 24. In this situation, at the factory, for an operator, an additional work for unlocking of the device by using a tool for disengaging the latch 50 from the catcher portion 35-2 would become necessary, which reduces a productivity. According to the last embodiment, such an additional work become unnecessary, thereby increasing productivity.

Embodiment for Provision of Water Draining Capability

In a different embodiment in FIGS. 28 to 30, a first and second fixing members 30F and 40F are provided. As similar to the previous embodiment, under a closed condition, the catch portion 35 in the fitting opening 35 of the first fixing member 30F and the latch 50 of the second fixing member 40F are engaged with each other (Refer also to FIG. 5-A in the first embodiment). As shown in FIG. 30, between the faced diametric divisional surfaces 30-2 and 40-2 of the first and second fixing members 30F and 40F, means such as stoppers are provided for leaving a gap G of a gap of a value of, for example, 1 mm or more between the surfaces 30-2 and 40-2, so that it extend along their entire diametric length. (A similar gap G is also shown in FIG. 5-A). Thus, the gap G between the surfaces 30-2 and 40-2 forms drain openings 72 (FIG. 29) at the bottom, i.e., at the ends of the fixing members 30F and 40F adjacent the hinge parts 31 and 40.

In addition, when no fluid passes through the pipes 10 and 20 so as not to generate any fluid pressure therein, the inner diameter of the first and second fixing members 30F and 40F is smaller than the outer diameter of the pipes 10 and 20, which allows the fixing members 30F and 40F under the closed condition to be freely rotatable with respect to the pipes 10 and 20. Namely, as shown in FIG. 30, an annular gap C is left between the pipes 10 and 20 and the fixing members 30F and 30F. Furthermore, the first and second fixing members 30F and 40F have respective center of gravity $g_{30}$ and $g_{40}$ which are located from the axis $O_x$ of the pipes 10 and 20. In order to obtain such an off centered arrangement of the first and second fixing members 30F and 40F, in this embodiment, locally increased width portions are provided at the hinge parts 31 and 41. In order to do this, a means can be employed such that the thickness of the hinge parts 31 and 41 is increased or a material of an incrased specific weight such as a steel plate is insert molded in the members 30F and 40F at the location adjacent the hinge parts 31 and 41. As a result of this, during the no load condition where no fluid passes through the pipes 10 and 20, the fixing device 1 constructed by the first and second fixing members 30F and 40F is always located so that the hinge parts 31 and 41 are located at the bottom, while the fitting device constructed by the latch 50 and catch 35 is located at the top, so long as the pipes 10 and 20 extend substantially in a horizontal direction, as shown in FIG. 28. This arrangement is obtained irrespective of a relative positioning of the fixing members 30F and 40F with respect to the pipes 10 and 20 when the fixing device is initially assembled since the off-center center of the gravity may cause the orientation of the member 30F ad 40F to be automatically corrected. In the case where the pipes 10 and 20 are for a refrigerant in an air conditioning device for an automobile, a vibration generated during the running of the automobile may promote such an automatic orientation correcting function of the arrangement in this embodiment.

Due to combination of the relative free rotation between the fixing members 30F and 40F, the provision of the gap G between the faced surfaces 30-2 and 40-2, and the off-centered arrangement of the fixing device 1, an automatic drain operation of water is obtained, which otherwise be accumulated in the space in the fixing device. Namely, as explained above, along the diametric divisional plane K (FIG. 30) which extends vertically, the gap G of a thickness of 1 mm or more is provided. The gap G functions as a drain passageway, which extends along the entire diametrical length of the divisional surfaces 30-2 and 40-2, which allows any water introduced into the space inside the fixing device is discharged from the draining holes 72 at the bottom of the gap G. Since a prolonged accumulation of water does not occur, it effectively stops the parts being prematurely corroded.

When the fluid passes through the pipes 10 and 20, a resultant fluid pressure causes the pipes to be radially outwardly inflated, so that a frictional force between the outer surfaces of the pipes 10 and 20 and the inner surface of the fixing member 30F and 40F is increased, so that the relative free rotation of the fixing members to the pipes 10 and 20 is prevented. However, when a passage of the fluid is canceled due to the stoppage of the air conditioning system, the outer diameter of the pipes shrinks, so that the off-centered arrangement of the center of gravity causes the fixing device to be rotated to the balanced position as shown in FIG. 38.

The above construction for draining water is advantageous in its simplified construction as obtained by a mere provision of the gap G between the faced surfaces 30-2 and 40-2 of the fixing members 30F and 40F.

It should be noted that the annular gap C (FIG. 30) between the pipes 10 and 20 and the fixing members 30F and 40F also functions to automatically drain water from the fixing device 1, when it is arranged so as to be oriented in a vertical direction. In this case, a bottom end of the gap C forms an annular drain hole 75.

In a modification in FIG. 31, the arrangement is reversed with respect to that in FIG. 31. Namely, in this modification, the fixing device 1 is heavier at its fitting parts 33 and 43 including the catch projection 35 and the latch member 50, respectively, and is lighter at its hinge parts 41 and 31. As a result, a freely rotated condition of the device 1 with respect to the pipes 10 and 20 allows the fixing device 1 to be located in such a manner that the fitted parts 33 and 43 are located at the bottom, while the hinge device (31 and 41) is located at the top, while a gap G along the divisional plane of the fixing members extends vertically as in the previous embodiment. Thus, an effective removal of the water accumulated in the space inside the fixing device 1 is obtained.

FIGS. 32 and 33 show a modification, where, at a location intermediate between the hinge part 31 and the fitting part, the fixing member 30 is provided with a weight 73 integrally formed at its outer cylindrical wall. Furthermore, at an axial location adjacent to the weight 73, the fixing member 30 is formed with drain holes 74 for connecting the space inside the fixing device with the atmosphere. Due to the existence of the weight 73, a free rotation of the fixing member 30 and 40 about the pipes 10 and 20 causes the device 1 automatically to take a position where the weight 73 is located at the bottom as shown in FIG. 32. Namely, the drain holes 74 are also located at the bottom. As a result, water inside the fixing device is discharged without being accumulated. It should be noted in the above embodiment such a weight 73 and drain holes 74 are provided not in the first fixing member 30 but in the second fixing member 40H.

We claim:

1. An apparatus for connecting pipes for passage of a fluid, comprising:

a male coupling member at an end of one of the pipes;

a female coupling member at an end of the other pipe, the male coupling being fitted to the female coupling member;

sealing means arranged between the male and female couplings;

a first and second fixing member having inner shapes for receiving therein the fitted coupling members for axially fixing their fitted condition to define a fixed condition thereof;

hinge means on the first and second fixing members for hingedly connecting the first and second fixing members;

releasable locking means on the first and second fixing members opposite the hinge means for locking the first and second fixing members;

wherein said female coupling member, to which the male coupling member is fitted, has a diameter larger than that of the pipe, so that an annular shoulder is formed at a location where the female coupling member is connected to said end of the pipe, and having, at an end thereof adjacent the male coupling member, a radially extending flange, the male coupling member having a radially extending projection at a location spaced from an end of the male coupling member disposed adjacent the female coupling member, whereby the male coupling member can be inserted into the female coupling member until said radially extending projection of the male coupling member is in axial contact with the flange of the female coupling member, and wherein at least one of the first and second fixing members forms an inner recess which cooperates with the flange of the female coupling member and radially extending projection of the male coupling member for causing the fitted coupling members to be axially engaged with said recess in said at least one of the first and second fixing members, said recess extending axially so as to cooperate also with the annular shoulder portion, thereby providing two axially spaced apart portions of said recess which axially engage with the female coupling member.

2. An apparatus according to claim 1, wherein said first and second fixing members have axially symmetrical recess configurations, which allows the flange of the female coupling member as well as the radially extending projection of the male coupling member to be engaged therewith.

3. An apparatus according to claim 1, wherein said locking means comprises a resilient latch member on one of said first and second fixing members and extending therefrom in a cantilever fashion, and a catch member on the other of said first and second fixing members, said latch member engaging with the catch member during a hinge movement between the first and second fixing members.

4. An apparatus according to claim 3, wherein said latch member has, at a free end thereof, a bent portion, which is directed away from the catch member.

5. An apparatus according to claim 3, wherein said latch member being slightly laterally outwardly inclined with respect to the direction of said relative hinge movement.

6. An apparatus according to claim 1, wherein said hinge means defines an additional relative position between the first and second fixing members, where the first and second fixing members are, at said second ends, spaced with each other at a predetermined distance, and wherein an application of a force greater than a predetermined provisional locking force is required to cause a relative movement to be generated between the first and second fixing members from the additional position to the locked position.

7. An apparatus for connecting pipes for passage of a fluid, comprising:

a male coupling member at an end of one of the pipes;

a female coupling member at an end of the other pipe, the male coupling being fitted to the female coupling member;

sealing means arranged between the male and female couplings;

a first and second fixing member having inner shapes for receiving therein the fitted coupling members for axially fixing their fitted condition to define a fixed condition thereof;

hinge means of the first and second fixing members for hingedly connecting the first and second fixing members;

releasable locking means on the first and second fixing members opposite the hinge means for locking the first and second fixing members;

wherein said hinge means comprise axially spaced apart first hinge parts on one of the first and second fixing members, axially spaced apart second hinge parts on the other of the first and second fixing members, hinge shafts extending integrally and in cantilever fashion from the first hinge part, while the hinge shafts forming a common hinge axis, the second hinge parts engaging the respective hinge shaft for allowing the relative hinge movement between the first and second fixing members.

8. An apparatus for connecting pipes for passage of a fluid, comprising:

a male coupling member at an end of one of the pipes;

a female coupling member at an end of the other pipe, the male coupling being fitted to the female coupling member;

sealing means arranged between the male and female couplings;

a first and second fixing member having inner shapes for receiving therein the fitted coupling members for axially fixing their fitted condition to define a fixed condition thereof;

hinge means of the first and second fixing members for hingedly connecting the first and second fixing members;

releasable locking means on the first and second fixing members opposite the hinge means for locking the first and second fixing members;

wherein said first and second fixing members have opposite grooves opened outwardly, and wherein said locking means comprise a resilient clip of a substantially C cross-sectional shape, having a first end engaged with one of the opposite grooves and a second end engaged with the other one of the grooves.

9. An apparatus for connecting pipes for passage of a fluid, comprising:

a male coupling member at an end of one of the pipes;

a female coupling member at an end of the other pipe, the male coupling being fitted to the female coupling member;

sealing means arranged between the male and female couplings;

a first and second fixing member having inner shapes for receiving therein the fitted coupling members for axially fixing their fitted condition to define a fixed condition thereof;

hinge means of the first and second fixing members for hingedly connecting the first and second fixing members;

releasable locking means on the first and second fixing members opposite the hinge means for locking the first and second fixing members;

wherein, at the fixed condition, a gap of a desired thickness is formed circumferentially between the coupling members and the first and second fixing means, whereby the fixing members and the coupling members can relatively rotate, and wherein the fixing members have at least one portion of locally increased weight whereby a center of gravity thereof is spaced from the axis of the pipes, and draining means at said locally increased weight portion for allowing a water in the apparatus to be drained.

10. An apparatus for connecting pipes for passage of a fluid, comprising:

a male coupling member at an end of one of the pipes;

a female coupling member at an end of the other pipe, the male coupling being fitted to the female coupling member;

sealing means arranged between the male and female couplings;

fixing means for receiving therein the fitted male and female coupling members, while engaging axially with the male and female coupling members for maintaining the fitted condition of the male and female coupling members;

wherein said female coupling member, to which the male coupling member is fitted, has a diameter larger than that of the pipe, so that an annular shoulder is formed at a location where the female coupling member is connected to said end of the pipe, and having, at an end thereof adjacent the male coupling member, a radially extending flange, the male coupling member having a radially extending projection at a location spaced from an end of the male coupling member disposed adjacent the female coupling member, whereby the male coupling member can be inserted into the female coupling member until said radially extending projection of the male coupling member is in axial contact with the flange of the female coupling member, and wherein at least one of the first and second fixing members forms an inner recess which cooperates with the flange of the female coupling member and the radially extending projection of the male coupling member for causing the fitted coupling members to be axially engaged with said recess in said at least one of the first and second fixing members, said recess extending axially so as to cooperate also with the annular shoulder portion, thereby providing two axially spaced apart portions of said recess which axially engage with the female coupling member.

11. An apparatus according to claim 10, wherein said annular shoulder portion is formed as a radially extending outer surface, the fixing means have radially extending inner surfaces which face, in parallel, the radially extending outer surface of the female coupling member, and these outer and inner radially extending surfaces are in an axial contacting condition.

12. An apparatus according to claim 11, wherein said fixing means have inner shapes which are axially symmetrical with each other.

13. An apparatus for connecting pipes for passage of a fluid, comprising:

a male coupling member at an end of one of the pipes;

a female coupling member at an end of the other pipe, the male coupling being fitted to the female coupling member;

sealing means arranged between the male and female couplings;

fixing means for receiving therein the fitted male and female coupling members, while engaging axially with the male and female coupling members for maintaining the fitted condition of the male and female coupling members;

said female coupling being provided with axially spaced first and second rest portions for axial engagement with the fixing means;

wherein said second rest portion is formed as a conical outer surface of the female coupling member, and said conical surface axially contact with said fixing means along a circumferential line.

14. An apparatus for connecting pipes for passage of a fluid, comprising:

a male coupling member at an end of one of the pipes;

a female coupling member at an end of the other pipe, the male coupling being fitted to the female coupling member;

sealing means arranged between the male and female couplings;

first and second fixing members of substantially semicircular shapes for receiving therein the fitted coupling members for fixing their fitted condition to define a fixed condition thereof;

hinge means of first ends of the first and second fixing members for hingedly connecting the first and second fixing members;

releasable locking means on second ends of the first fixing member for releasably locking the first and second fixing members with each other;

the first and second fixing members each being formed with a recess for axial engagement with the male and female coupling members, thereby axially fixing the male and female coupling members with each other;

wherein said female coupling member, to which the male coupling member is fitted, has a diameter larger than that of the pipe, so that an annular shoulder is formed at a location where the female coupling member is connected to said end of the pipe, and having, at an end thereof adjacent the male coupling member, a radially extending flange, the male coupling member having a radially extending projection at a location spaced from an end of the male coupling member disposed adjacent the female coupling member, whereby the male coupling member can be inserted into the female coupling member until said radially extending projection of the male coupling member is in axial contact with the flange of the female coupling member, and wherein at least one of the first and second fixing members forms an inner recess which cooperates with the flange of the female coupling member and the radially extending projection of the male coupling member for causing the fitted coupling members to be axially engaged with said recess in said at least one of the first and second fixing members, said recess extending axially so as to cooperate also with the annular shoulder portion, thereby providing two axially spaced apart portions of said recess which axially engage with the female coupling member.

15. A coupling device for objects to be connected, comprising:

a first and second fixing members having inner shapes corresponding to outer shapes of the objects;

hinge means at first ends of the first and second fixing members whereby the first and second fixing members can be relatively rotated;

releasable locking means at second ends of the first and second fixing members for defining a locking position where the first and second fixing members are, at said second ends, connected with each other;

in the locked condition, said objects being connected with each other by means of the fixing members;

said hinge means defining an additional relative position between the first and second fixing members, where the first and second fixing members are, at said second ends, spaced from each other by a predetermined distance;

an application of a force greater than a predetermined provisional locking force being required to cause a relative movement to be generated, between the first and second fixing members, from the additional position to the locked position.

16. An apparatus according to claim 15, wherein said hinge means comprising a hinge shaft at said first end of the first fixing member and a support member at said first end of the second fixing member for rotatably holding the hinge shaft, and wherein, at said additional position, an arrangement between the hinge shaft and the support member being such that a locally increased contacting force is generated for obtaining said provisional locking force.

17. An apparatus according to claim 16, wherein said hinge shaft has a cross-sectional shape of an elongated circle having different lengths of axis, and wherein the locally increased contact force between the hinge shaft and the support member at the additional position is obtained due to the face that the hinge shaft contacts, at the long axis, with wall means defining a hole in the support member, said wall means defining a hole corresponding at least in part to a shape of said hinge shaft.

18. An apparatus according to claim 15, wherein said first and second fixing members are made from a thermoplastic resin.

19. An apparatus for connecting pipes for passage of a fluid, comprising:

a male coupling member at an end of one of the pipes;

a female coupling member at an end of the other pipe, the male coupling being fitted to the female coupling member;

first and second fixing members having inner shapes corresponding to outer shapes of the fitted coupling;

hinge means at first ends of the first and second fixing members for enabling a relative rotation movement between the first and second fixing members;

releasable locking means at second ends of the first and second fixing members for defining a locking position where the first and second fixing members are, at said second ends, connected with each other;

at the locking position, the fitted couplings being connected with each other by means of the fixing members;

said hinge means defining an additional relative position between the first and second fixing members, where the first and second fixing members are, at said second ends, spaced with each other at a predetermined distance;

an application of a force greater than a provisional force being required for a relative movement to be generated, between the first and second fixing members, from the additional position to the locked position.

20. An apparatus for connecting pipes for passage of a fluid, comprising:

a male coupling member at an end of one of the pipes;

a female coupling member at an end of the other pipe, the male coupling being fitted to the female coupling member;

sealing means arranged between the male and female couplings;

fixing means for storing therein the fitted male and female couplings and for maintaining an axial connection therebetween;

a gap of a desired thickness being formed circumferentially between the coupling members and the fixing means, whereby the fixing means and the pipes can relatively rotate;

the fixing means having a portion of a locally increased weight whereby a center of gravity thereof is spaced from the axis of the pipes; and draining means at said locally increased weight portion for allowing a water in the apparatus to be drained.

21. An apparatus for connecting pipes for passage of a fluid, comprising:

a male coupling member at an end of one of the pipes;

a female coupling member at an end of the other pipe, the male coupling being fitted to the female coupling member;

sealing means arranged between the male and female couplings;

first and second fixing members having substantially semicircular shape for storing therein the fitted portion of the male and female couplings;

hinge means at first ends of the first and second fixing members for enabling a relative rotating movement between the first and second fixing members;

releasable locking means at second ends of the first and second fixing members for releasably locking said first and second fixing members;

the fitted part of the coupling members being located inside the first and second fixing members under locked condition, thereby defining an axially fixed condition of the male and female couplings;

at the fixed condition, a gap of a desired thickness being formed circumferentially between the coupling members and the first and second fixing means, whereby a relative rotation can occur between the fixing members and the pipes;

the fixing members having at least one portion of locally increased weight for providing a center of gravity which is spaced from the axis of the pipes; and draining means at said portion for allowing a water in the apparatus to be drained.

22. An apparatus according to claim 21, wherein said portion of the locally increased weight is located at one of the first and second ends of at least one of the fixing members, and the draining means being constructed by a gap between the first and second fixing means at said portion.

23. An apparatus according to claim 21, wherein said portion of the locally increased weight is located at an intermediate position between the first and second ends of one of the fixing members, and the draining means being constructed by a hole formed in said portion.

24. An apparatus according to claim 21, wherein said first and second fixing members are formed by a resin.

* * * * *